(12) United States Patent
Shiee et al.

(10) Patent No.: US 11,034,516 B1
(45) Date of Patent: Jun. 15, 2021

(54) GENERATION OF FOOTPRINT DATA FOR ITEMS

(71) Applicant: AMAZON TECHNOLOGIES, INC., Seattle, WA (US)

(72) Inventors: Navid Shiee, Seattle, WA (US); Michel Leonard Goldstein, Seattle, WA (US); Ramanathan Palaniappan, Issaquah, WA (US); Gopi Prashanth Gopal, Redmond, WA (US); Xiaofeng Ren, Yarrow Point, WA (US); Ohil Krishnamurthy Manyam, Bellevue, WA (US); Christopher Robert Towers, Seattle, WA (US); Yasser Baseer Asmi, Redmond, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 16/510,606

(22) Filed: Jul. 12, 2019

Related U.S. Application Data

(63) Continuation of application No. 14/570,475, filed on Dec. 15, 2014, now Pat. No. 10,384,869.

(51) Int. Cl.
    *G06K 7/10* (2006.01)
    *B65G 1/02* (2006.01)
    *H04N 5/232* (2006.01)

(52) U.S. Cl.
    CPC ........... *B65G 1/02* (2013.01); *H04N 5/23232* (2013.01)

(58) Field of Classification Search
    CPC .. G06K 7/10722; G06K 7/14; G06K 7/10851; B65G 1/02; H04N 5/23232

USPC ......................................................... 235/454
See application file for complete search history.

(56) References Cited

U.S. PATENT DOCUMENTS

| | | | |
|---|---|---|---|
| 6,409,085 B1 | 6/2002 | Gu | |
| 7,100,824 B2 | 9/2006 | Ostrowski | |
| 7,225,980 B2 | 6/2007 | Ku et al. | |
| 7,246,745 B2 | 7/2007 | Hudnut et al. | |
| 7,949,568 B2 | 5/2011 | Fano et al. | |
| 8,009,864 B2 | 8/2011 | Linaker et al. | |

(Continued)

OTHER PUBLICATIONS

Asthana, Abhaya, "An Indoor Wireless System for Personalized Shopping Assistance", CiteSeerX, in Proceedings of IEEE Workshop on Mobile Computing Systems and Applications, 1994, 6 pages. Retrieved from the Internet: http://citeseerx.ist.psu.edu/viewdoc/summary?doi=10.1.1.127.3303.

(Continued)

*Primary Examiner* — Ahshik Kim
(74) *Attorney, Agent, or Firm* — Lindauer Law, PLLC

(57) ABSTRACT

An item stowed at an inventory location may rest or be supported by a surface, such as a shelf, that includes an optical sensor array. The optical sensor array comprises a plurality of optical sensors that detect light intensity values. When a light source illuminates the item resting on the surface, a footprint or shadow is cast by the item onto the surface. Such a shadow is detected by the light intensity values at the optical sensors in the optical sensor array. Once the shadow is detected, information about the area, shape, and perimeter of the shadow can be determined and saved as footprint data for a single item. Such a process can be performed at intake of the item to the facility and later accessed to determine a quantity of the item on a shelf of a facility.

20 Claims, 13 Drawing Sheets

(56) References Cited

U.S. PATENT DOCUMENTS

| | | | |
|---|---|---|---|
| 8,189,855 B2 | 5/2012 | Opalach et al. | |
| 8,571,298 B2* | 10/2013 | McQueen | G06K 7/10861 |
| | | | 382/143 |
| 8,630,924 B2 | 1/2014 | Groenevelt et al. | |
| 9,235,928 B2 | 1/2016 | Medioni et al. | |
| 9,595,098 B2 | 3/2017 | Hicks | |
| 10,108,830 B2* | 10/2018 | Kakino | G06K 9/00 |
| 2009/0063306 A1 | 3/2009 | Fano et al. | |
| 2009/0063307 A1* | 3/2009 | Groenovelt | G06Q 10/087 |
| | | | 705/28 |
| 2010/0217678 A1 | 8/2010 | Goncalves | |
| 2011/0011936 A1* | 1/2011 | Morandi | G06Q 20/203 |
| | | | 235/454 |
| 2012/0133488 A1 | 5/2012 | Choi et al. | |
| 2012/0284132 A1 | 11/2012 | Kim et al. | |
| 2013/0284806 A1 | 10/2013 | Margalit | |
| 2015/0086107 A1 | 3/2015 | Dedeoglu et al. | |

OTHER PUBLICATIONS

Kalnikaite, et al., "How to Nudge in Situ: Designing Lambent Devices to Deliver Information Salience in Supermarkets", ACM, in proceeding of: UbiComp 2011:Ubiquitous Computing, 13th International Conference, UbiComp 2011, Beijing, China, Sep. 17-21, 2011, 10 pages. Retrieved from the Internet: http://www.researchgate.net/publication/221568350_How_to_nudge_in_Situ_designing_lambent_devices_to_deliver_salient_information_in_supermarkets.
Pop, Cristian, "Introduction to the BodyCom Technology" AN1391, DS01391A, Microchip Technology, Inc., May 2, 2011, 26 pages. Retrieved from the Internet: http://www.microchip.com//wwwAppNotes/AppNotes.aspx?appnote=en555156.

* cited by examiner

GENERATION OF FOOTPRINT DATA FOR ITEMS

PRIORITY

This application is a continuation of, and claims priority to, U.S. patent application Ser. No. 14/570,475, filed on Dec. 15, 2014, entitled "Optical Item Management System," now U.S. Pat. No. 10,348,869, which is hereby incorporated by reference in its entirety.

BACKGROUND

Retailers, wholesalers, and other product distributors typically maintain an inventory of various items that may be ordered, purchased, leased, borrowed, rented, viewed, and so forth, by clients or customers. For example, an e-commerce website may maintain inventory in a fulfillment center. When a customer orders an item, the item is picked from inventory, routed to a packing station, packed, and shipped to the customer. Likewise, physical stores maintain inventory in customer accessible areas, such as in a shopping area, and customers can pick items from inventory and take them to a cashier for purchase, rental, and so forth.

Many physical stores also maintain inventory in a storage area, fulfillment center, or other facility that can be used to replenish inventory located in the shopping areas or to satisfy orders for items that are placed through other channels (e.g., e-commerce). Other examples of entities that maintain facilities holding inventory include libraries, museums, rental centers, and so forth. In each instance, for an item to be moved from one location to another, it is picked from its current location and transitioned to a new location. It is often desirable to monitor quantity of inventory within the facility.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
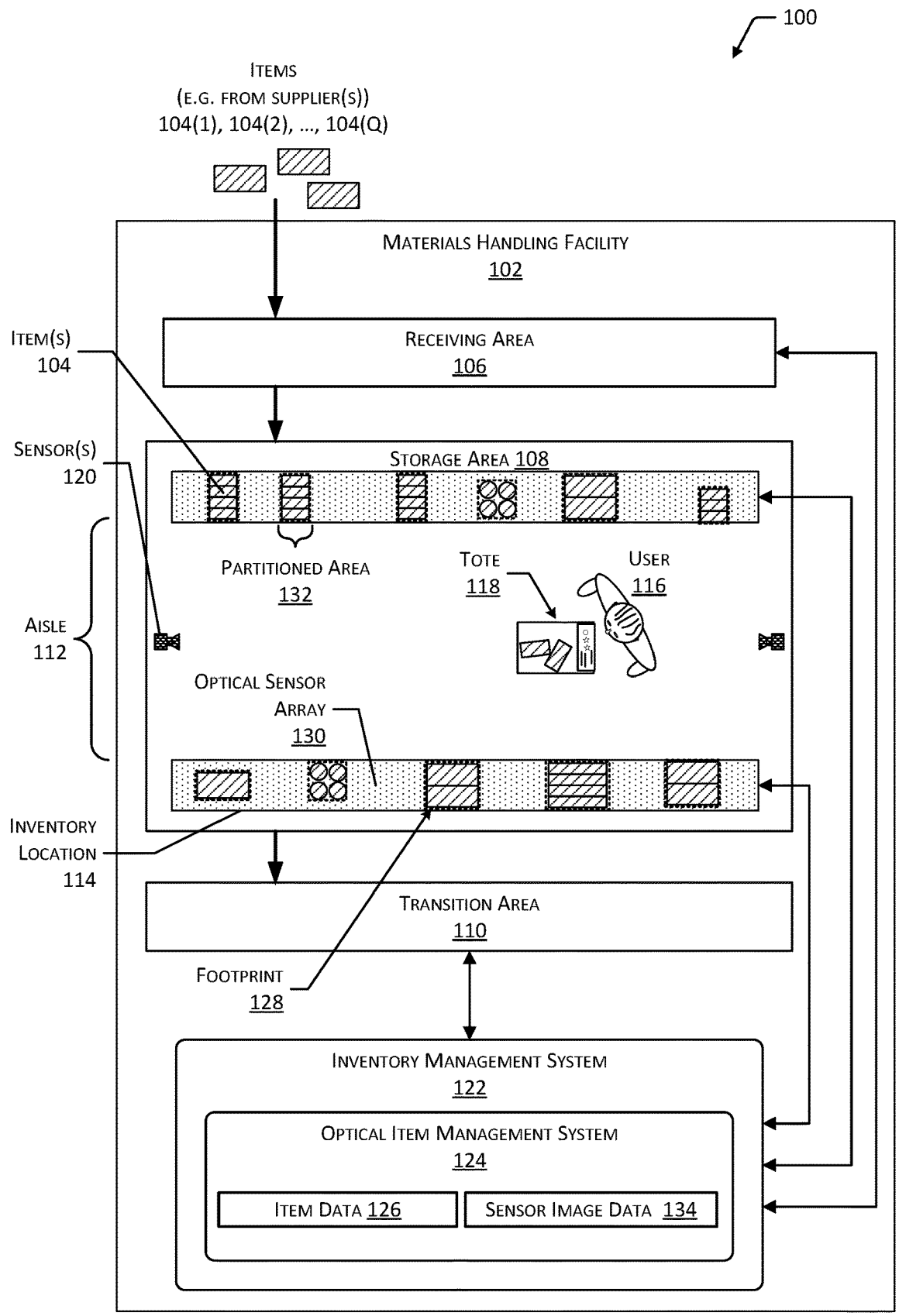
FIG. 1 is a block diagram illustrating a materials handling facility (facility) having optical sensor arrays, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes systems and techniques for determining inventory levels of items stored at inventory locations in a materials handling facility (facility) or other setting. The facility may include, or have access to, an inventory management system. The inventory management system may be configured to maintain information about items, users, condition of the facility, and so forth. For example, the inventory management system may maintain data indicative of a number of items at a particular inventory location, what items a particular user is ordered to pick, how many items have been picked or placed at the inventory location, requests for assistance, environmental status of the facility, and so forth. Operation of the facility may be facilitated by using one or more sensors to acquire information about the facility.

Inventory levels may include information about the quantity and location of items present in the facility. For example, the inventory management system may keep track of four inventory locations in the facility where a particular item is stored and how many of that item are present at the four inventory locations.

Described in this disclosure are devices and techniques for gathering and processing data that may be used to generate information about inventory levels in the facility. An optical sensor array comprising a plurality of optical sensors is placed next to where items are stored in an inventory location. Each of the optical sensors may generate light intensity values indicative of how much light has reached them.

The optical sensor array may comprise the optical sensors arranged in a two-dimensional array, such as a rectangular grid pattern. Light from a light source falls upon the inventory location and may reach the optical sensors or interact with one or more items at the inventory location. The interaction of the one or more items with the light casts a shadow upon one or more of the optical sensors. Items may have transparency ranging from opaque to transparent. For example, a bag of flour may be opaque while a bottle of water may pass at least some light to the optical sensors below. The shadow may be detected as a change in the light intensity values generated by one or more of the optical sensors.

A relative arrangement of the optical sensors within the two-dimensional array is known. For example, where the two-dimensional array is in a grid array denoted by rows and columns, an arrangement of an optical sensor at coordinates (1, 1) (row, column) is known to be adjacent to another optical sensor at coordinates (1, 2).

In one example, the inventory location may comprise a shelf upon which items may rest, with the shelf including an optical sensor array. Light emitting diode (LED) lights above the shelf may emit light down towards the shelf and the optical sensors below.

Sensor image data is acquired from the optical sensor array. The sensor image data may comprise information indicative of a light intensity value determined by an optical sensor at particular coordinates. The sensor image data may be expressed using a variety of different data structures. For ease of illustration and discussion, the sensor image data is discussed and illustrated as an image or picture comprising pixels in a two-dimensional array. One pixel in the image may correspond to the output of one optical sensor.

The sensor image data is processed to generate footprint data. The footprint data is indicative of the shadow cast by the items onto the optical sensor array. By comparing the footprint data with previously stored information, a count of items at the inventory location corresponding to the optical sensor array or a portion thereof may be determined. For example, previously stored item data for a single bag of flour may indicate that the single bag of flour has a footprint area of 100 pixels. The sensor image data may be processed to determine footprint data indicating the bags of flour on the shelf have an area of 1000 pixels. By dividing the area of the footprint data by the area of a single item known to be stored on that shelf, a count of items may be determined. Continuing the example, the area of the footprint of the bags of flour may be 1000 pixels, divided by 100 pixels per bag results in a count of 10 bags on that shelf.

Footprint data may be acquired at different times, and differences between the footprint data may be used to determine when items have been added to or removed from an inventory location. For example, the sensor image data acquired at successive times may be compared to look for changes in the pixels between the sensor images. Should a change be detected, a count of "before" and "after" may be determined and used to update inventory levels of that inventory location.

In some implementations, a single optical sensor array may be associated with the storage of different items. Continuing the example above, the inventory location may comprise a shelf that incorporates the optical sensor array. The shelf may support a quantity of items "A" and items "B". Groups of the different items may be arranged in "lanes" on the shelf. In this example, a group of items "A" may be on a left half of the optical sensor array while a group of items "B" may be on a right half. Partition area data may be used to designate a particular portion or section of the optical sensor array, the resulting sensor image data, or both, are associated with the different items. Continuing the example, the partition area data may indicate the area of the left half of the shelf is associated with items "A" while the area of the right half of the shelf is associated with items "B". The partition area data may be associated with a particular item identifier, optical sensor array, inventory location, and so forth.

The system may maintain or access item data. The item data may include, but is not limited to, area of a footprint of a single item, absorption threshold data indicative of transparency of the item, shape of a contour of the footprint, and so forth. In some implementations, the item data may be acquired during intake of the item to the facility. For example, a sample of a single item may be processed at intake using an optical sensor array and light source to generate the footprint data of a single item.

In other implementations, data about the items already stowed at an inventory location may be used. In this implementation, an assumption may be made that the footprint for each individual item is the same. For example, all boxes of the same stock keeping unit (SKU) have the same shape and resulting footprint. Based on this assumption, per-item footprint data may be generated based on a total footprint of items at the inventory location divided by a count indicated by quantity data. The quantity data may be obtained from data acquired by other sensors, a user manually counting the number of items at the inventory location, and so forth. For example, a manual count may indicate that a quantity of ten items is present at an inventory location. Given a total detected footprint of this quantity having an area of 1000 pixels, the area for an individual item may be calculated as 100 pixels.

The optical sensor array and the sensor image data therefrom may be used to support other aspects of the facility. For example, the sensor image data may be processed to assess tidiness of the items at the inventory locations. Continuing the example, information indicative of several small footprints (rather than a single large one) at an inventory location may be indicative of a lane that needs to be faced or otherwise cleaned up.

By using the devices and techniques described herein, operation of the facility may be improved. Inventory levels of items at particular inventory locations may be maintained in real-time. As items are picked or placed at inventory locations, information about the changing inventory levels may be used to order additional items, direct pick or place personnel within the facility, and so forth. As a result, stockouts, wasted time due to users travelling to unstocked inventory locations, and so forth, may be reduced or eliminated, improving throughput and reducing operating costs of the facility.

Illustrative System

An implementation of a materials handling system 100 configured to store and manage inventory items is illustrated in FIG. 1. A materials handling facility 102 (facility) comprises one or more physical structures or areas within which one or more items 104(1), 104(2), . . . , 104(Q) may be held. As used in this disclosure, letters in parenthesis such as "(Q)" indicate an integer value. The items 104 comprise physical goods, such as books, pharmaceuticals, repair parts, electronic gear, and so forth.

The facility 102 may include one or more areas designated for different functions with regard to inventory handling. In this illustration, the facility 102 includes a receiving area 106, a storage area 108, and a transition area 110.

The receiving area 106 may be configured to accept items 104, such as from suppliers, for intake into the facility 102.

For example, the receiving area 106 may include a loading dock at which trucks or other freight conveyances unload the items 104.

The storage area 108 is configured to store the items 104. The storage area 108 may be arranged in various physical configurations. In one implementation, the storage area 108 may include one or more aisles 112. The aisle 112 may be configured with, or defined by, inventory locations 114 on one or both sides of the aisle 112. The inventory locations 114 may include one or more of shelves, racks, cases, cabinets, bins, floor locations, or other suitable storage mechanisms for holding, supporting, or storing the items 104. The inventory locations 114 may be affixed to the floor or another portion of the facility's 102 structure. The inventory locations 114 may also be movable such that the arrangements of aisles 112 may be reconfigurable. In some implementations, the inventory locations 114 may be configured to move independently of an outside operator. For example, the inventory locations 114 may comprise a rack with a power source and a motor, operable by a computing device to allow the rack to move from one location within the facility 102 to another.

One or more users 116(1), 116(2), . . . , 116(U) and totes 118(1), 118(2), . . . , 118(T) or other material handling apparatus may move within the facility 102. For example, the user 116 may move about within the facility 102 to pick or place the items 104 in various inventory locations 114, placing them on the tote 118 for ease of transport. The tote 118 is configured to carry or otherwise transport one or more items 104. For example, the tote 118 may include a basket, cart, bag, bin, and so forth. The tote 118 is discussed in more detail below with regard to FIG. 5. In other implementations, other material handling apparatuses such as robots, forklifts, cranes, aerial drones, and so forth, may move about the facility 102 picking, placing, or otherwise moving the items 104. For example, a robot may pick an item 104 from a first inventory location 114(1) and move the item 104 to a second inventory location 114(2).

One or more sensors 120 may be configured to acquire information in the facility 102. The sensors 120 may include, but are not limited to, optical sensors, cameras, three-dimensional (3D) sensors, weight sensors, radio frequency (RF) receivers, temperature sensors, humidity sensors, vibration sensors, and so forth. The sensors 120 may be stationary or mobile, relative to the facility 102. For example, the inventory locations 114 may contain cameras configured to acquire images of picking or placement of items 104 on shelves, of users 116 in the facility 102, and so forth. In another example, the floor of the facility 102 may include weight sensors configured to determine a weight of the user 116 or other object thereupon. The sensors 120 are discussed in more detail below with regard to FIG. 2.

While the storage area 108 is depicted as having one or more aisles 112, inventory locations 114 storing the items 104, sensors 120, and so forth, it is understood that the receiving area 106, the transition area 110, or other areas of the facility 102 may be similarly equipped. Furthermore, the arrangement of the various areas within the facility 102 is depicted functionally rather than schematically. For example, in some implementations, multiple different receiving areas 106, storage areas 108, and transition areas 110 may be interspersed rather than segregated in the facility 102.

The facility 102 may include, or be coupled to, an inventory management system 122. The inventory management system 122 is configured to interact with users 116 or devices such as sensors 120, robots, material handling equipment, computing devices, and so forth, in one or more of the receiving area 106, the storage area 108, or the transition area 110.

During operation of the facility 102, the sensors 120 may be configured to provide information suitable for tracking the location of objects within the facility 102, their movement, and so forth. For example, a series of images acquired by the camera may indicate removal of an item 104 from a particular inventory location 114 by the user 116 and placement of the item 104 on or at least partially within the tote 118. Objects may include, but are not limited to, items 104, users 116, totes 118, and so forth.

The facility 102 may be configured to receive different kinds of items 104 from various suppliers and to store them until a customer orders or retrieves one or more of the items 104. A general flow of items 104 through the facility 102 is indicated by the arrows of FIG. 1. Specifically, as illustrated in this example, items 104 may be received from one or more suppliers, such as manufacturers, distributors, wholesalers, and so forth, at the receiving area 106. In various implementations, the items 104 may include merchandise, commodities, perishables, or any suitable type of item 104, depending on the nature of the enterprise that operates the facility 102.

Upon being received from a supplier at the receiving area 106, the items 104 may be prepared for storage in the storage area 108. For example, in some implementations, items 104 may be unpacked or otherwise rearranged. The inventory management system 122 may include one or more software applications executing on a computer system to provide inventory management functions. These inventory management functions may include maintaining information indicative of the type, quantity, condition, cost, location, weight, or any other suitable parameters with respect to the items 104. The items 104 may be stocked, managed, or dispensed in terms of countable units, individual units, or multiple units, such as packages, cartons, crates, pallets, or other suitable aggregations. Alternatively, some items 104, such as bulk products, commodities, and so forth, may be stored in continuous or arbitrarily divisible amounts that may not be inherently organized into countable units. Such items 104 may be managed in terms of measurable quantity such as units of length, area, volume, weight, time, duration, or other dimensional properties characterized by units of measurement. Generally speaking, a quantity of an item 104 may refer to either a countable number of individual or aggregate units of an item 104 or a measurable amount of an item 104, as appropriate.

After arriving through the receiving area 106, items 104 may be stored within the storage area 108. In some implementations, like items 104 may be stored or displayed together in the inventory locations 114 such as in bins, on shelves, hanging from pegboards, and so forth. In this implementation, all items 104 of a given kind are stored in one inventory location 114. In other implementations, like items 104 may be stored in different inventory locations 114. For example, to optimize retrieval of certain items 104 having frequent turnover within a large physical facility 102, those items 104 may be stored in several different inventory locations 114 to reduce congestion that might occur at a single inventory location 114.

When a customer order specifying one or more items 104 is received, or as a user 116 progresses through the facility 102, the corresponding items 104 may be selected or "picked" from the inventory locations 114 containing those items 104. In various implementations, item picking may range from manual to completely automated picking. For example, in one implementation, a user 116 may have a list of items 104 they desire and may progress through the facility 102 picking items 104 from inventory locations 114 within the storage area 108, and placing those items 104 into a tote 118. In other implementations, employees of the facility 102 may pick items 104 using written or electronic pick lists derived from customer orders. These picked items 104 may be placed into the tote 118 as the employee progresses through the facility 102.

After items 104 have been picked, they may be processed at a transition area 110. The transition area 110 may be any designated area within the facility 102 where items 104 are transitioned from one location to another or from one entity to another. For example, the transition area 110 may be a packing station within the facility 102. When the item 104 arrives at the transition area 110, the item 104 may be transitioned from the storage area 108 to the packing station. Information about the transition may be maintained by the inventory management system 122.

In another example, if the items 104 are departing the facility 102, a list of the items 104 may be obtained and used by the inventory management system 122 to transition responsibility for, or custody of, the items 104 from the facility 102 to another entity. For example, a carrier may accept the items 104 for transport with that carrier accepting responsibility for the items 104 indicated in the list. In another example, a user 116 may purchase or rent the items 104 and remove the items 104 from the facility 102. During use of the facility 102, the user 116 may move about the facility 102 to perform various tasks, such as picking or placing the items 104 in the inventory locations 114.

The inventory management system 122 may include or be in communication with an optical item management system 124. The optical item management system 124 may be configured to access item data 126. The item data 126 may comprise information about one or more of the items 104. The item data 126 may include, but is not limited to, area data indicative of an area of the footprint or shadow of a single item 104, shape of the footprint of the single item 104, information indicative of a particular inventory location 114 at which the item 104 is stowed, and so forth.

An item 104 at an inventory location 114 may exhibit a footprint 128 with respect to an optical sensor array 130. The footprint 128 is illustrated with a dotted line in this figure. In one implementation, the optical sensor array 130 may be located below the item 104, such as within a shelf upon which the item 104 is supported. The footprint 128 may comprise a shadow of the item 104 as cast onto the optical sensor array 130. The footprint 128 may be of a single item 104 or a group of items 104 stored at the inventory location 114. The footprint 128 may be the shadow of the item 104 cast upon the optical sensor array 130 regardless of position of the shadow with respect to the item 104. For example, where the optical sensor array 130 is on a vertical wall behind the items 104, the footprint 128 may comprise the shadow cast on that wall.

The optical sensor array 130 may comprise one or more sensors 120, such as optical sensors. The optical sensors may be arranged in a regular, repeating, or periodic two-dimensional arrangement such as a grid. Each of the optical sensors may be configured to provide output indicative of a light intensity value. For example, the optical sensors may generate an 8-bit value indicative of an intensity of light ranging from value 255 indicating maximum intensity to value 0 indicating minimum intensity. In another implementation, the light intensity value may be a 1-bit value of 0 or 1. Implementations of the optical sensor array 130 are described below in more detail, such as with regard to FIGS. 6, 7, and 9.

A single optical sensor array 130 may be associated with several different items 104. For example, the inventory location 114 may comprise a shelf that includes an optical sensor array 130. The shelf may have sufficient space to allow for storage of several different kinds of items 104. Items 104 may be grouped together and placed within a partitioned area 132. For example, a left half of the shelf may store a first kind of item 104, while a right half of the shelf may store a second kind of item 104. The optical item management system 124 may be configured to access partition data indicative of which portion of the optical sensor array 130, or an output thereof, is associated with a particular item 104. For example, the partitioned area 132 may comprise a lane or row of identical items 104 positioned one in front of another.

The optical sensor array 130 may generate sensor image data 134. The sensor image data 134 may comprise a plurality of pixels. Each pixel may correspond to a position within the two-dimensional arrangement of the optical sensors and also comprises the light intensity value from the optical sensor at the position. In some implementations, the sensor image data 134 may comprise a subset of the optical sensors within the optical sensor array 130. For example, the sensor image data 134 may comprise information from the optical sensors within a particular partitioned area 132. In another example, sensor image data 134 from an optical sensor array 130 having a plurality of partitioned areas 132 may be segmented into the respective partitioned areas 132 for further processing.

The optical item management system 124 is configured to use the item data 126 and the sensor image data 134 to generate information associated with operation of the facility 102. For example, a quantity of items 104 at a partitioned area 132 may be determined. Item data 126 that includes previously stored information such as an area of a footprint 128 of an individual item 104 may be retrieved. Using the sensor image data 134, an area of a current footprint 128 may be determined. By dividing the area of the current footprint 128 by the previously stored area of the footprint 128 of an individual item 104, a count of the number of items 104 within the partitioned area 132 may be generated.

The optical item management system 124 may provide data to the inventory management system 122, and vice versa. For example, quantity data for the inventory location 114 associated with the partitioned area 132 may be provided to the inventory management system 122. In another example, the inventory management system 122 may provide quantity data to the optical item management system 124 such as from a manual count by the user 116 or another sensor system such as a weight system. The optical item management system 124 may be configured to generate at least a portion of the item data 126 such as the footprint 128 of an individual item 104 using information from other systems. Continuing the example, a known quantity of 10 items 104 at the partitioned area 132 of the inventory location 114 may be accessed by the optical item management system 124. Using the optical sensor array 130 to generate sensor image data 134, a total footprint 128 area of 1000 pixels may be determined. The optical item management system 124 may calculate the per item 104 area by dividing the total footprint by the known quantity. In this example, each item 104 may be determined to have a footprint 128 with an area of 100 pixels.

In some implementations, items 104 may be processed, such as at the receiving area 106, to generate at least a portion of the item data 126. For example, an item 104 not previously stored by the inventory management system 122 may be placed on an optical sensor array 130 and a footprint 128 may be generated as part of a process to receive the item 104 into the facility 102. Continuing the example, the item data 126 generated may include an area footprint, absorption threshold comprising data indicative of transparency of the item 104, and so forth.

By using the optical item management system 124, the inventory management system 122 is able to maintain item data 126 such as inventory levels of a particular item 104 at a particular inventory location 114 without manual intervention by a user 116. As a result, the inventory management system 122 may be better able to allocate resources and items 104 to maintain the smooth operation of the facility 102. For example, based on the optical item management system 124, item data 126 may be generated indicating that a particular inventory location 114 is low on stock of a particular item 104. By using this information, the inventory management system 122 may perform one or more actions including generating an order for additional items 104, generating instructions to transfer stock from elsewhere in the facility 102 to replenish the particular inventory location 114, and so forth.

Figure 2:
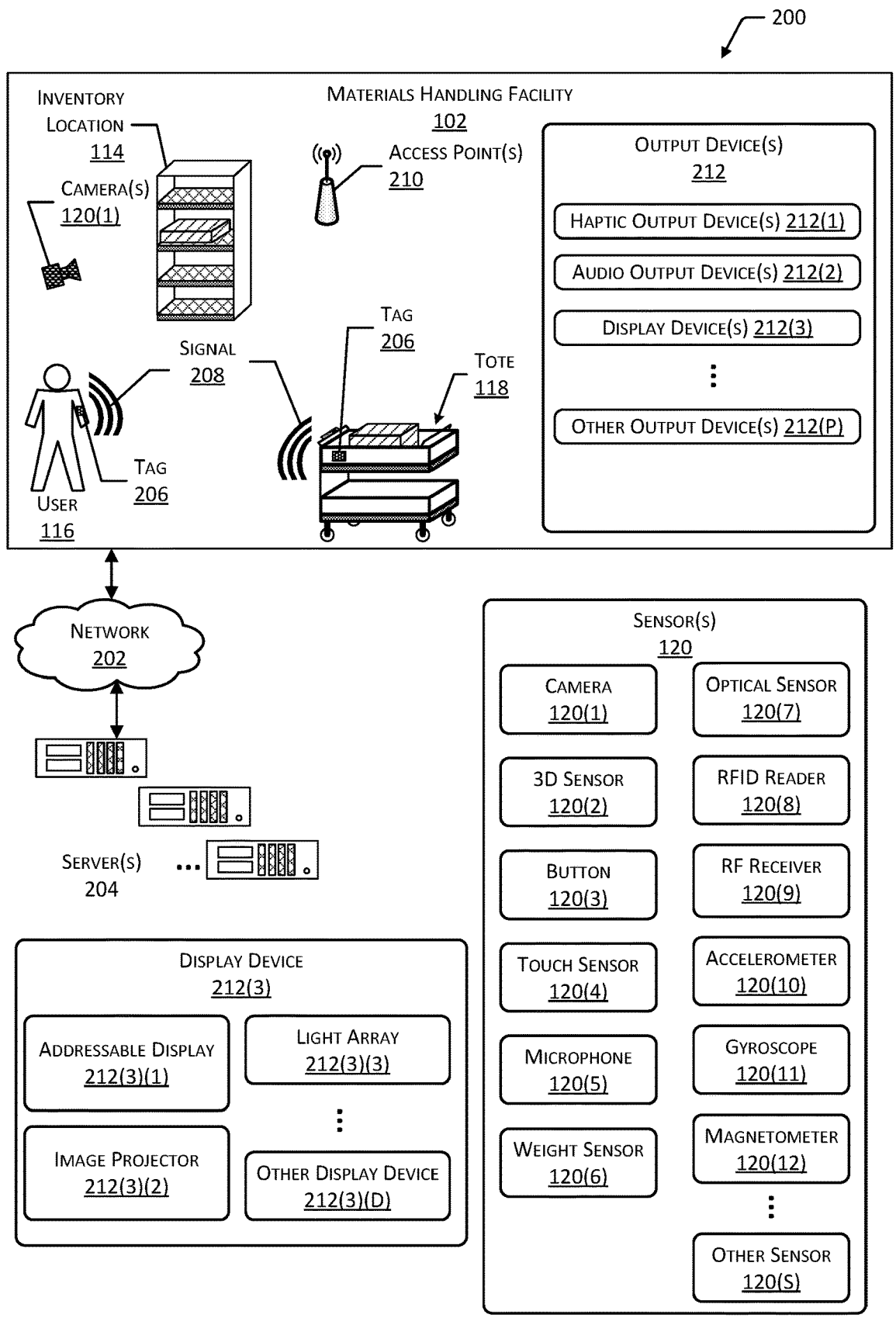
FIG. 2 is a block diagram illustrating additional details of the facility, according to some implementations.

FIG. 2 is a block diagram 200 illustrating additional details of the facility 102, according to some implementations. The facility 102 may be connected to one or more networks 202, which in turn connect to one or more servers 204. The network 202 may include private networks such as an institutional or personal intranet, public networks such as the Internet, or a combination thereof. The network 202 may utilize wired technologies (e.g., wires, fiber optic cables, and so forth), wireless technologies (e.g., radio frequency, infrared, acoustic, optical, and so forth), or other connection technologies. The network 202 is representative of any type of communication network, including one or more of data networks or voice networks. The network 202 may be implemented using wired infrastructure (e.g., copper cable, fiber optic cable, and so forth), a wireless infrastructure (e.g., cellular, microwave, satellite, and so forth), or other connection technologies.

The servers 204 may be configured to execute one or more modules or software applications associated with the inventory management system 122, the optical item management system 124, and so forth. While the servers 204 are illustrated as being in a location outside of the facility 102, in other implementations, at least a portion of the servers 204 may be located at the facility 102. The servers 204 are discussed in more detail below with regard to FIG. 3.

The users 116, the totes 118, or other objects in the facility 102 may be equipped with one or more tags 206. The tags 206 may be configured to emit a signal 208. In one implementation, the tag 206 may be a radio frequency identification (RFID) tag configured to emit a RF signal 208 upon activation by an external signal. For example, the external signal may comprise a radio frequency signal or a magnetic field configured to energize or activate the RFID tag 206. In another implementation, the tag 206 may comprise a transmitter and a power source configured to power the transmitter. For example, the tag 206 may comprise a Bluetooth Low Energy (BLE) transmitter and battery. In other implementations, the tag 206 may use other techniques to indicate presence of the tag 206. For example, an acoustic tag 206 may be configured to generate an ultrasonic signal 208, which is detected by corresponding acoustic receivers. In yet another implementation, the tag 206 may be configured to emit an optical signal 208.

The inventory management system 122 may be configured to use the tags 206 for one or more of identification of the object, determining a location of the object, and so forth. For example, the users 116 may wear tags 206, the totes 118 may have tags 206 affixed, and so forth, which may be read and, based at least in part on signal strength, used to determine identity and location.

Generally, the inventory management system 122 or other systems associated with the facility 102 may include any number and combination of input components, output components, and servers 204.

The one or more sensors 120 may be arranged at one or more locations within the facility 102. For example, the sensors 120 may be mounted on or within a floor, wall, at a ceiling, at an inventory location 114, on a tote 118, may be carried or worn by a user 116, and so forth.

The sensors 120 may include one or more cameras 120(1). The one or more cameras 120(1) may include imaging sensors configured to acquire images of a scene. The imaging sensors are configured to detect light in one or more wavelengths including, but not limited to, terahertz, infrared, visible, ultraviolet, and so forth. The imaging sensors may comprise charge coupled devices (CCD), complementary metal oxide semiconductor (CMOS) devices, microbolometers, and so forth. The inventory management system 122 may use image data acquired by the cameras 120(1) during operation of the facility 102. For example, the inventory management system 122 may identify items 104, users 116, totes 118, and so forth, based at least in part on their appearance within the image data acquired by the cameras 120(1). The cameras 120(1) may be mounted in various locations within the facility 102. For example, cameras 120(1) may be mounted overhead, on inventory locations 114, may be worn or carried by users 116, may be affixed to totes 118, and so forth.

One or more 3D sensors 120(2) may also be included in the sensors 120. The 3D sensors 120(2) are configured to acquire spatial or 3D data, such as depth information, about objects within a field of view of a sensor 120. The 3D sensors 120(2) include range cameras, lidar systems, sonar systems, radar systems, structured light systems, stereo vision systems, optical interferometry systems, and so forth. The inventory management system 122 may use the 3D data acquired by the 3D sensors 120(2) to identify objects, determine a location of an object in 3D real space, and so forth.

One or more buttons 120(3) are configured to accept input from the user 116. The buttons 120(3) may comprise mechanical, capacitive, optical, or other mechanisms. For example, the buttons 120(3) may comprise mechanical switches configured to accept an applied force from a touch of the user 116 to generate an input signal. The inventory management system 122 may use data from the buttons 120(3) to receive information from the user 116. For example, the tote 118 may be configured with a button 120(3) to accept input from the user 116 and send information indicative of the input to the inventory management system 122.

The sensors 120 may include one or more touch sensors 120(4). The touch sensors 120(4) may use resistive, capacitive, surface capacitance, projected capacitance, mutual capacitance, optical, Interpolating Force-Sensitive Resistance (IFSR), or other mechanisms to determine the position of a touch or near-touch. For example, the IFSR may comprise a material configured to change electrical resistance responsive to an applied force. The location within the material of that change in electrical resistance may indicate the position of the touch. The inventory management system 122 may use data from the touch sensors 120(4) to receive information from the user 116. For example, the touch sensor 120(4) may be integrated with the tote 118 to provide a touchscreen with which the user 116 may select from a menu one or more particular items 104 for picking, enter a manual count of items 104 at an inventory location 114, and so forth.

One or more microphones 120(5) may be configured to acquire information indicative of sound present in the environment. In some implementations, arrays of microphones 120(5) may be used. These arrays may implement beamforming techniques to provide for directionality of gain. The inventory management system 122 may use the one or more microphones 120(5) to acquire information from acoustic tags 206, accept voice input from the users 116, determine the location of one or more users 116 in the facility 102, determine ambient noise level, and so forth.

One or more weight sensors 120(6) are configured to measure the weight of a load, such as the item 104, the user 116, the tote 118, and so forth. The weight sensors 120(6) may be configured to measure the weight of the load at one or more of the inventory locations 114, the tote 118, on the floor of the facility 102, and so forth. The weight sensors 120(6) may include one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms of weight sensors 120(6) may operate as transducers that generate one or more signals based on an applied force, such as that of the load due to gravity. The inventory management system 122 may use the data acquired by the weight sensors 120(6) to identify an object, determine a location of an object, maintain shipping records, and so forth.

The sensors 120 may include one or more optical sensors 120(7). The optical sensors 120(7) may be configured to provide data indicative of one or more of color or intensity of light impinging thereupon. For example, the optical sensor 120(7) may comprise a photodiode and associated circuitry configured to generate a signal or data indicative of an incident flux of photons. As described below, the optical sensor array 130 may comprise a plurality of the optical sensors 120(7). For example, the optical sensor array 130 may comprise an array of ambient light sensors such as the ISL76683 as provided by Intersil Corporation of Milpitas, Calif., USA, or the MAX44009 as provided by Maxim Integrated of San Jose, Calif., USA. In other implementations, other optical sensors 120(7) may be used. The optical sensors 120(7) may be sensitive to one or more of infrared light, visible light, or ultraviolet light. For example, the optical sensors 120(7) may be sensitive to infrared light, and infrared light sources such as LEDs may provide illumination.

The optical sensors 120(7) may include photodiodes, photoresistors, photovoltaic cells, quantum dot photoconductors, bolometers, pyroelectric infrared detectors, and so forth. For example, the optical sensor 120(7) may use germanium photodiodes to detect infrared light.

One more radio frequency identification (RFID) readers 120(8), near field communication (NFC) systems, and so forth, may be included as sensors 120. For example, the RFID readers 120(8) may be configured to read the RF tags 206. Information acquired by the RFID reader 120(8) may be used by the inventory management system 122 to identify an object associated with the RF tag 206 such as the item 104, the user 116, the tote 118, and so forth. For example, based on information from the RFID readers 120(8) detecting the RF tag 206 at different times and RFID readers 120(8) having different locations in the facility 102, a velocity of the RF tag 206 may be determined.

One or more RF receivers 120(9) may also be included as sensors 120. In some implementations, the RF receivers 120(9) may be part of transceiver assemblies. The RF receivers 120(9) may be configured to acquire RF signals 208 associated with Wi-Fi, Bluetooth, ZigBee, 3G, 4G, LTE, or other wireless data transmission technologies. The RF receivers 120(9) may provide information associated with data transmitted via radio frequencies, signal strength of RF signals 208, and so forth. For example, information from the RF receivers 120(9) may be used by the inventory management system 122 to determine a location of an RF source, such as a communication interface onboard the tote 118 or carried by the user 116.

The sensors 120 may include one or more accelerometers 120(10), which may be worn or carried by the user 116, mounted to the tote 118, and so forth. The accelerometers 120(10) may provide information such as the direction and magnitude of an imposed acceleration. Data such as rate of acceleration, determination of changes in direction, speed, and so forth, may be determined using the accelerometers 120(10).

A gyroscope 120(11) provides information indicative of rotation of an object affixed thereto. For example, the tote 118 or other objects may be equipped with a gyroscope 120(11) to provide data indicative of a change in orientation of the object.

A magnetometer 120(12) may be used to determine an orientation by measuring ambient magnetic fields, such as the terrestrial magnetic field. The magnetometer 120(12) may be worn or carried by the user 116, mounted to the tote 118, and so forth. For example, the magnetometer 120(12) mounted to the tote 118 may act as a compass and provide information indicative of which direction the tote 118 is oriented.

The sensors 120 may include other sensors 120(S) as well. For example, the other sensors 120(S) may include proximity sensors, ultrasonic rangefinders, thermometers, barometric sensors, hygrometers, biometric input devices including, but not limited to, fingerprint readers or palm scanners, and so forth. For example, the inventory management system 122 may use information acquired from thermometers and hygrometers in the facility 102 to direct the user 116 to check on delicate items 104 stored in a particular inventory location 114, which is overheating, too dry, too damp, and so forth.

In some implementations, the camera 120(1) or other sensors 120 may include hardware processors, memory, and other elements configured to perform various functions. For example, the cameras 120(1) may be configured to generate image data, send the image data to another device such as the server 204, and so forth.

The facility 102 may include one or more access points 210 configured to establish one or more wireless networks. The access points 210 may use Wi-Fi, NFC, Bluetooth, or other technologies to establish wireless communications between a device and the network 202. The wireless networks allow the devices to communicate with one or more of the sensors 120, the inventory management system 122, the optical sensor arrays 130, the tag 206, a communication device of the tote 118, or other devices.

Output devices 212 may also be provided in the facility 102. The output devices 212 are configured to generate signals, which may be perceived by the user 116 or detected by the sensors 120. In some implementations, the output devices 212 may be used to provide illumination of the optical sensor array 130.

Haptic output devices 212(1) are configured to provide a signal that results in a tactile sensation to the user 116. The haptic output devices 212(1) may use one or more mechanisms such as electrical stimulation or mechanical displacement to provide the signal. For example, the haptic output devices 212(1) may be configured to generate a modulated electrical signal, which produces an apparent tactile sensation in one or more fingers of the user 116. In another example, the haptic output devices 212(1) may comprise piezoelectric or rotary motor devices configured to provide a vibration, which may be felt by the user 116.

One or more audio output devices 212(2) are configured to provide acoustic output. The acoustic output includes one or more of infrasonic sound, audible sound, or ultrasonic sound. The audio output devices 212(2) may use one or more mechanisms to generate the acoustic output. These mechanisms may include, but are not limited to, the following: voice coils, piezoelectric elements, magnetostrictive elements, electrostatic elements, and so forth. For example, a piezoelectric buzzer or a speaker may be used to provide acoustic output.

The display devices 212(3) may be configured to provide output, which may be seen by the user 116 or detected by a light-sensitive sensor such as a camera 120(1) or an optical sensor 120(7). In some implementations, the display devices 212(3) may be configured to produce output in one or more of infrared, visible, or ultraviolet light. The output may be monochrome or color.

The display devices 212(3) may be emissive, reflective, or both. An emissive display device 212(3), such as using LEDs, is configured to emit light during operation. In comparison, a reflective display device 212(3), such as using an electrophoretic element, relies on ambient light to present an image. Backlights or front lights may be used to illuminate non-emissive display devices 212(3) to provide visibility of the output in conditions where the ambient light levels are low.

The display mechanisms may include, but are not limited to, microelectromechanical systems (MEMS), spatial light modulators, electroluminescent displays, quantum dot displays, liquid crystal on silicon (LCOS) displays, cholesteric displays, interferometric displays, liquid crystal displays (LCDs), electrophoretic displays, and so forth. For example, the display device 212(3) may use a light source and an array of MEMS-controlled mirrors to selectively direct light from the light source to produce an image. These display mechanisms are configured to emit light, modulate incident light emitted from another source, or both. The display devices 212(3) may operate as panels, projectors, and so forth.

The display devices 212(3) may be configured to present images. For example, the display device 212(3) may comprise an addressable display 212(3)(1). The addressable display 212(3)(1) comprises elements that may be independently addressable to produce output, such as pixels. For example, the addressable display 212(3)(1) may produce an image using a two-dimensional array of pixels.

In some implementations, the display devices 212(3) may be configured to provide non-image data, such as text characters, colors, and so forth. For example, an addressable display 212(3)(1) may comprise a segmented electrophoretic display device 212(3), segmented LED, and so forth, and may be used to present information such as a SKU number, quantity on hand, and so forth. The display devices 212(3) may also be configurable to vary the color of the segment, such as using multicolor/multi-wavelength LED segments.

The display devices 212(3) may include image projectors 212(3)(2). For example, the image projector 212(3)(2) may be configured to project an image onto objects, illuminate at least a portion of an optical sensor array 130, and so forth. The image may be generated using MEMS, LCOS, lasers, and so forth.

The display devices 212(3) may include a light array 212(3)(3). The light array 212(3)(3) may comprise a plurality of discrete emissive elements configurable to emit light. The discrete emissive elements (or assemblies thereof) may be separated from one another by a distance such that, when image data of the light array 212(3)(3) is acquired, one emissive element may be distinguished from another. For example, the light array 212(3)(3) may comprise a plurality of infrared LEDs separated by at least 0.5 centimeters.

Other display devices 212(3)(D) may also be used in the facility 102. The display devices 212(3) may be located at various points within the facility 102. For example, the addressable displays 212(3)(1) or the light arrays 212(3)(3) may be located on inventory locations 114, totes 118, in or on the floor of the facility 102, and so forth.

Other output devices 212(P) may also be present. For example, the other output devices 212(P) may include scent/odor dispensers, document printers, 3D printers or fabrication equipment, and so forth.

Figure 3:
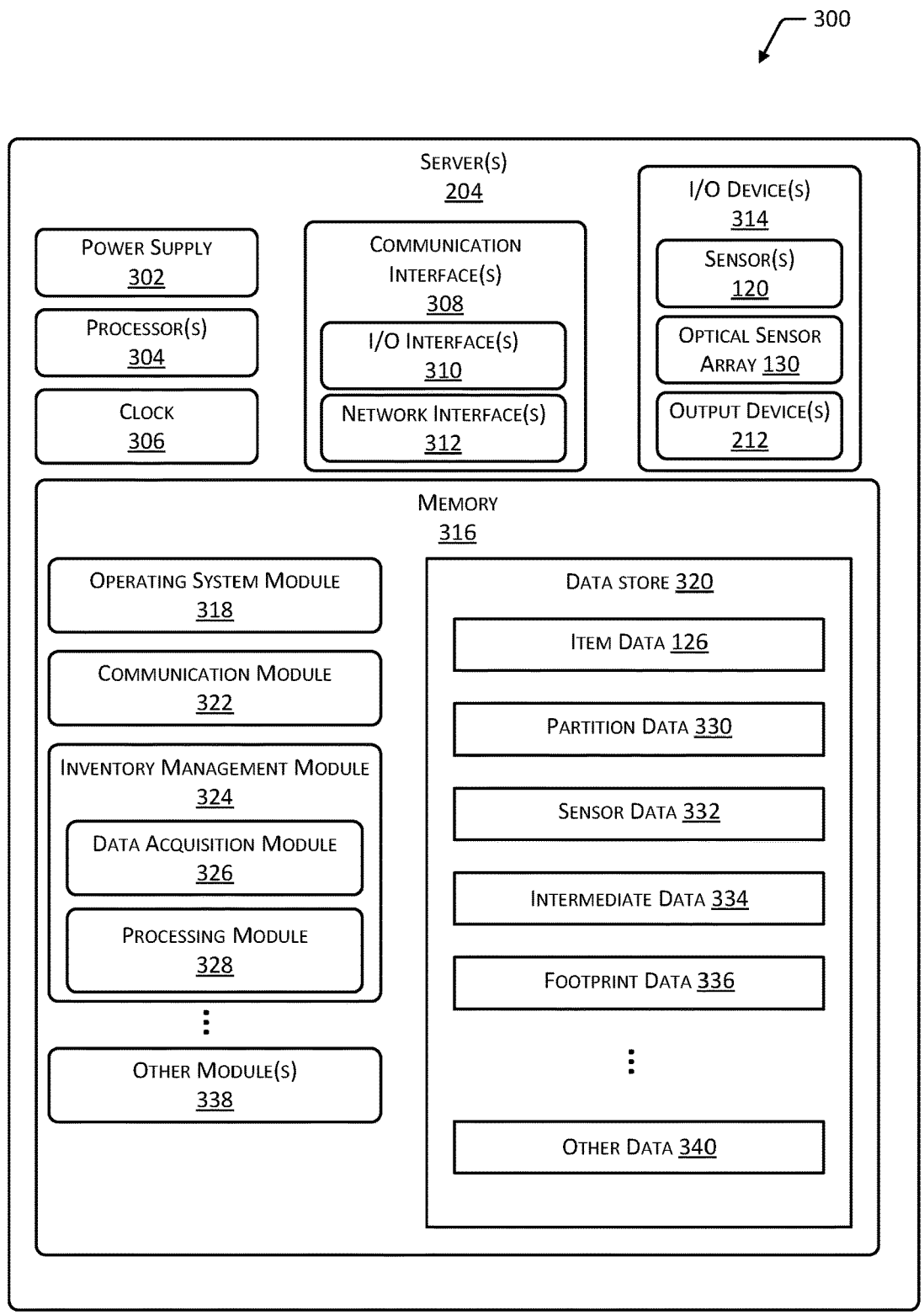
FIG. 3 is a block diagram of a server configured to support operation of the facility, according to some implementations.

FIG. 3 illustrates a block diagram 300 of a server 204 configured to support operation of the facility 102, according to some implementations. The server 204 may be physically present at the facility 102, may be accessible by the network 202, or a combination of both. The server 204 does not require end-user knowledge of the physical location and configuration of the system that delivers the services. Common expressions associated with the server 204 may include "on-demand computing", "software as a service (SaaS)", "platform computing", "network-accessible platform", "cloud services", "data centers", and so forth. Services provided by the server 204 may be distributed across one or more physical or virtual devices.

One or more power supplies 302 are configured to provide electrical power suitable for operating the components in the server 204. The one or more power supplies 302 may comprise batteries, capacitors, fuel cells, photovoltaic cells, wireless power receivers, conductive couplings suitable for attachment to an external power source such as provided by an electric utility, and so forth. The server 204 may include one or more hardware processors 304 (processors) configured to execute one or more stored instructions. The processors 304 may comprise one or more cores. One or more clocks 306 may provide information indicative of date, time, ticks, and so forth. For example, the processor 304 may use data from the clock 306 to associate a quantity of items 104 with a particular point in time.

The server 204 may include one or more communication interfaces 308 such as input/output (I/O) interfaces 310, network interfaces 312, and so forth. The communication interfaces 308 enable the server 204, or components thereof, to communicate with other devices or components. The communication interfaces 308 may include one or more I/O interfaces 310. The I/O interfaces 310 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 310 may couple to one or more I/O devices 314. The I/O devices 314 may include input devices such as one or more of a sensor 120, an optical sensor array 130, keyboard, mouse, scanner, and so forth. The I/O devices 314 may also include output devices 212 such as one or more of a display device 212(3), printer, audio speakers, and so forth. In some embodiments, the I/O devices 314 may be physically incorporated with the server 204 or may be externally placed.

The network interfaces 312 are configured to provide communications between the server 204 and other devices, such as the totes 118, routers, access points 210, and so forth. The network interfaces 312 may include devices configured to couple to personal area networks (PANs), local area networks (LANs), wide area networks (WANs), and so forth. For example, the network interfaces 312 may include devices compatible with Ethernet, Wi-Fi, Bluetooth, Zig-Bee, and so forth.

The server 204 may also include one or more busses or other internal communications hardware or software that allow for the transfer of data between the various modules and components of the server 204.

As shown in FIG. 3, the server 204 includes one or more memories 316. The memory 316 comprises one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 316 provides storage of computer-readable instructions, data structures, program modules, and other data for the operation of the server 204. A few example functional modules are shown stored in the memory 316, although the same functionality may alternatively be implemented in hardware, firmware, or as a system on a chip (SOC).

The memory 316 may include at least one operating system (OS) module 318. The OS module 318 is configured to manage hardware resource devices such as the I/O interfaces 310, the I/O devices 314, the communication interfaces 308, and provide various services to applications or modules executing on the processors 304. The OS module 318 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth.

Also stored in the memory 316 may be a data store 320 and one or more of the following modules. These modules may be executed as foreground applications, background tasks, daemons, and so forth. The data store 320 may use a flat file, database, linked list, tree, executable code, script, or other data structure to store information. In some implementations, the data store 320 or a portion of the data store 320 may be distributed across one or more other devices including the servers 204, network attached storage devices, and so forth.

A communication module 322 may be configured to establish communications with one or more of the totes 118, sensors 120, display devices 212(3), other servers 204, or other devices. The communications may be authenticated, encrypted, and so forth.

The memory 316 may store an inventory management module 324. The inventory management module 324 is configured to provide the inventory functions as described herein with regard to the inventory management system 122. For example, the inventory management module 324 may track items 104 between different inventory locations 114, to and from the totes 118, and so forth.

The inventory management module 324 may include one or more of a data acquisition module 326 or a processing module 328. The data acquisition module 326 may be configured to acquire and access information associated with operation of the facility 102. For example, the data acquisition module 326 may be configured to acquire sensor image data 134 from one or more optical sensor arrays 130. This information may be stored in the data store 320 as part of the sensor data 332.

The processing module 328 may be configured to process the sensor image data 134 to generate information such as a quantity of items 104 at an inventory location 114, change in quantity over time, and so forth. The processing module 328 may also be configured to use one or more of item data 126, partition data 330, or sensor data 332 to generate intermediate data 334. The intermediate data 334 may be used to generate footprint data 336. The intermediate data 334 is discussed in more detail below with regard to FIG. 4.

Processing of the sensor data 332, intermediate data 334, or other data may be performed by the processing module 328 or other modules implementing at least in part one or more of the following tools or techniques. In one implementation, processing described in this disclosure may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In another implementation, functions available in the OKAO machine vision library as promulgated by Omron Corporation of Kyoto, Japan, may be used to process the sensor data 332.

Techniques such as artificial neural networks (ANN), active appearance models (AAM), active shape models (ASM), principal component analysis PCA, and so forth, may also be used to process the sensor data 332, intermediate data 334, and so forth. For example, the ANN may be a trained using a supervised learning algorithm such that object identifiers are associated with images of particular objects within training images provided to the ANN. Once trained, the ANN may be provided with the sensor data 332 such as the sensor image data 134, image data from a camera 120(1), and so forth, and may provide as output the object identifier.

Operation of the processing module 328 and the various types of data involved are described in more detail below with regard to FIG. 4.

Other modules 338 may also be present in the memory 316 as well as other data 340 in the data store 320. For example, the other modules 338 may include an accounting module while the other data 340 may include billing data. The accounting module may be configured to assess charges to accounts associated with particular users 116 or other entities, while the billing data may include information such as payment account numbers.

Figure 4:
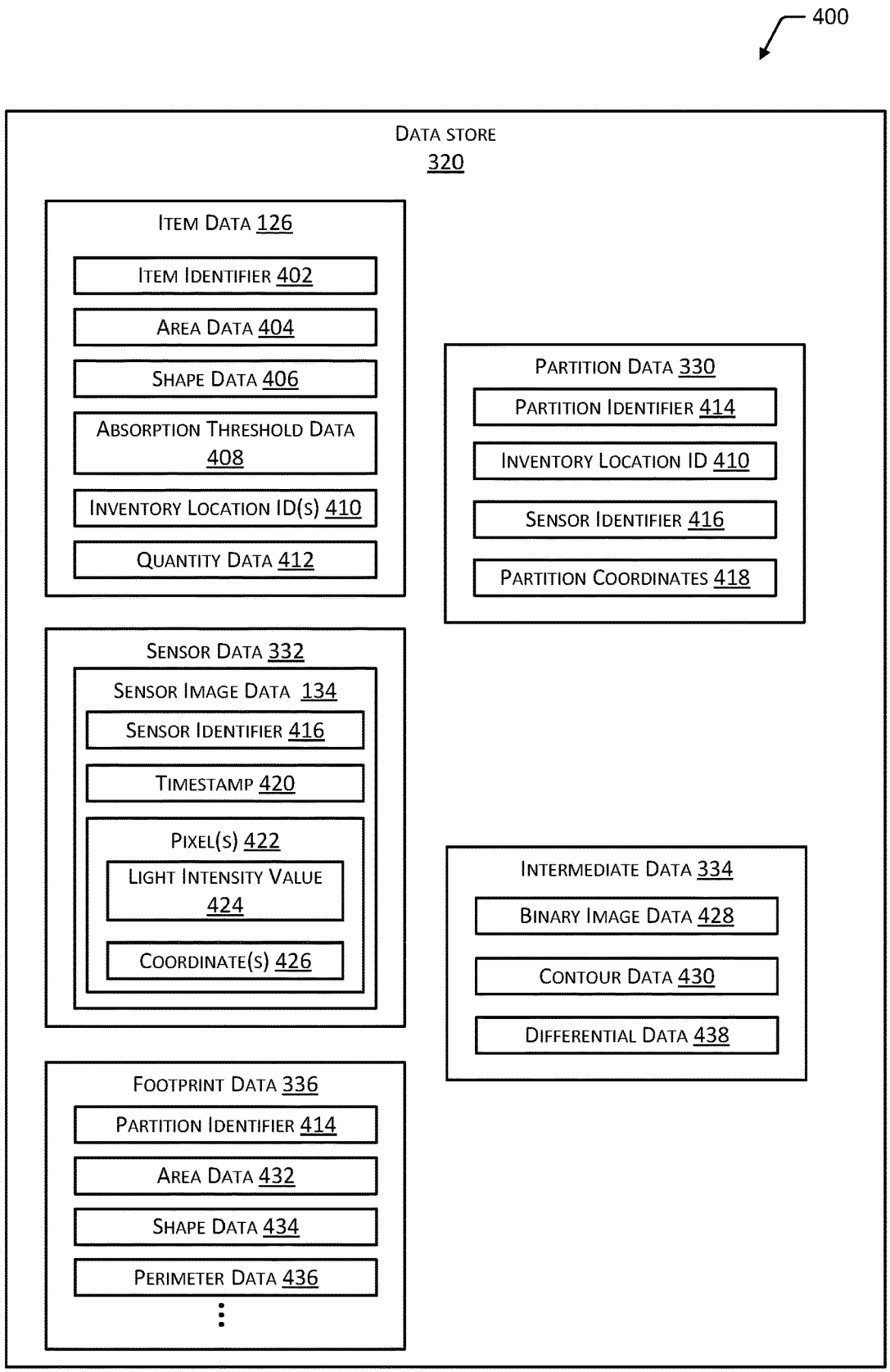
FIG. 4 is a block diagram of additional data that may be used by the server to support operation of the facility, according to some implementations.

FIG. 4 is a block diagram 400 of additional data that may be used by the server 204 to support operation of the facility 102, according to some implementations. As described above with regard to FIG. 3, the inventory management module 324 may use the sensor image data 134 to generate other information such as a quantity on hand of a particular item 104.

The processing module 328 may access item data 126. The item data 126 may include an item identifier 402. The item identifier 402 may be used to distinguish one item 104 from another. For example, the item identifier 402 may include a SKU, Universal Product Code (UPC) number, and so forth. The items 104 that are of the same type may be referred to by the same item identifier 402. For example, one-pound bags of "Road Runner" brand flour may be represented by the item identifier 402 value of "983901181".

The item data 126 may include one or more of area data 404, shape data 406, or absorption threshold data 408. The area data 404 may comprise information indicative of an area of a footprint 128 of the item 104. For example, the area data 404 may comprise an area as measured in pixels, square centimeters, and so forth. The area data 404 may be for a single item 104, or a package or kit of objects considered to be a single item 104.

The shape data 406 comprises information indicative of the shape of the footprint 128. The shape data 406 may comprise information indicative of one or more contours of the footprint 128. For example, the shape data 406 may comprise information indicating that the footprint 128 of the item 104 is a rectangle measuring three pixels by seven pixels.

The absorption threshold data 408 provides information indicative of how transparent the item 104 is to the light detected by the optical sensor array 130. For example, the absorption threshold data 408 may comprise a $75^{th}$ percentile value of the light intensity values 424 of the pixels 422 that are within a contour of the footprint 128 of the single item 104. The absorption threshold data 408 may be used to generate intermediate data 334, such as binary image data described below. Generation of the absorption threshold data 408 is discussed below in more detail.

The item data 126 may include one or more inventory location identifiers (IDs) 410. The inventory location IDs 410 are indicative of a particular inventory location 114 that is designated for stowage of the item 104. The item data 126 may also include quantity data 412. The quantity data 412 may comprise a count or value indicative of a number of items 104. The count may be an actual or estimated value. The quantity data 412 may be associated with a particular inventory location ID 410, such as when the same item 104 is stowed at several different inventory locations 114.

The partition data 330 may include one or more of a partition identifier 414, inventory location ID 410, sensor identifier 416, or partition coordinates 418. As described above, in some implementations, a single optical sensor array 130 may service several different kinds of items 104, with each item 104 being associated with a different item identifier 402. For example, the optical sensor array 130 may be incorporated into a shelf of the inventory location 114. Three different items 104(1), 104(2), and 104(3) may be stored on that same shelf serviced by a single optical sensor array 130, with each item 104 in a partitioned area 132(1), 132(2), 132(3), respectively.

The partition identifier 414 comprises data indicative of a particular partition area 132. The partition identifier 414 may be unique in the context of a particular inventory location 114, aisle 112, facility 102, or globally across multiple facilities 102. The inventory location ID 410 included in the partition data 330 associates the particular partition identifier 414 with a particular inventory location 114. The particular inventory location 114 may then be associated with the item identifier 402 indicative of the items 104 stored therein.

The sensor identifier 416 comprises data indicative of a particular optical sensor array 130. The sensor identifier 416 may be unique in the context of a particular inventory location 114, aisle 112, facility 102, or globally across multiple facilities 102.

The partition coordinates 418 specify an area that encompasses the partition area 132. For example, the partition coordinates 418 may specify two or more of corners of a rectangular partitioned area 132.

The sensor data 332 may be acquired by one or more the sensors 120, the optical sensor array 130, and so forth. For example, the weight sensors 120(6) may generate sensor data 332 indicative of weight. The sensor data 332 may include the sensor image data 134.

The sensor image data 134 may include one or more of the sensor identifier 416, a timestamp 420, and one or more pixels 422. The sensor identifier 416 indicates the one or more optical sensor arrays 130 that generated the sensor image data 134. The timestamp 420 may be indicative of a date or time at which the sensor image data 134 was acquired. The pixels 422 may comprise data acquired from one or more of the optical sensors 120(7). In one implementation, a single optical sensor 120(7) may be represented by a single pixel 422. Each pixel 422 may include information indicative of a light intensity value 424. The light intensity value 424 provides information indicative of a flux of light impinging upon the optical sensor 120(7) at a particular time. For example, the light intensity value 424 may comprise an 8 or 16-bit value produced by the optical sensor 120(7). The pixel 422 may also include information indicative of a coordinate 426 or relative position of the pixel 422 with respect to other pixels 422 or an origin point. For example, the coordinates 426 may indicate that a particular pixel 422 is at an intersection of a particular row and column. The coordinates 426 may express a relative position within the two-dimensional arrangement of the optical sensor array 130. In one implementation, the sensor image data 134 may be represented as a two-dimensional matrix.

In some implementations, the pixels 422 may also include color or spectral data. For example, each pixel 422 may have a plurality of light intensity values 424, with each of the light intensity values 424 indicative of an intensity of a different wavelength or range of wavelengths of light.

The processing module 328 may access the item data 126, the partition data 338, and the sensor data 332 and generate intermediate data 334. The processing module 328 may access threshold data and generate binary image data 428 from the sensor image data 134.

The threshold data may be used to distinguish whether a pixel 422 in the resulting binary image data 428 will be designated as a binary "0" value or binary "1" value. For example, the binary image data 428 may be generated by comparing the light intensity value 424 of each pixel 422 with a threshold value. In this example, the threshold value may be an 8-bit value of "50". The pixels 422 having a light intensity value 424 below 50 may result in a pixel 422 in the binary image data 428 having a binary value of "1". In other implementations, the opposite values may be used, such as values below the threshold value being assigned a binary value of "0".

By thresholding in this fashion, the resulting binary image data 428 may be more easily processed to determine edges or contours. For example, the OpenCV function "threshold" may be used to generate the binary image data 428. In other implementations, other thresholding techniques may be used.

The processing module 328 may be configured to generate contour data 430 using the binary image data 428. The contour data 430 may provide information indicative of a shape having a closed or complete perimeter. In some implementations, the contour data 430 may be indicative of a curve or open perimeter. For example, an edge appearing in the footprint 128 may be incomplete. This may occur due to an optical anomaly, erroneous reading by an optical sensor 120(7), and so forth. The processing module 328 may be configured to close an open perimeter.

The contour data 430 may comprise the coordinates 426 of the pixels 422 within the binary image data 428 having a binary value of "1" or "0". In other implementations, the contour data 430 may comprise a vector value, matrix of values, or other information representative of the perimeter of a footprint 128. For example, the OpenCV function "FindContours" may be used to generate the contour data 430.

In some implementations, the binary image data 428 may be further processed to reduce noise, simplify later processing, and so forth. For example, an erosion function may be applied to the binary image data 428. In one implementation where the contour is represented by binary "1" s, in the binary image data 428, the erosion function may be configured to set to a value of "0" those pixels 422 adjacent to, but not part of, a contour. For example, the OpenCV function "erode" may be used. In some implementations, the erosion may use a 1 pixel neighborhood boundary. Second binary image data 428 may be generated as a result of this processing, or the original binary image data 428 may be modified.

The intermediate data 334 may also comprise differential data 438. The differential data 438 may be indicative of a change or difference between sensor image data 134 at different times. For example, the differential data 438 may result from subtraction of one binary image from another, one sensor image from another, and so forth. In other implementations, the differential data 438 may comprise data indicative of results of a comparison. For example, the differential data 438 may indicate whether or not a change has occurred.

The footprint data 336 may comprise one or more of a partition identifier 414, area data 432, shape data 434, perimeter data 436, or other information generated from or indicative of the footprint 128. The partition identifier 414 indicates the particular partition data 330 associated with the footprint 128. For example, a particular footprint 128 may be associated with a particular partition area 132 and the item 104 stowed thereby. The area data 432 indicates an area of the footprint 128. In one implementation, the area data 432 may comprise an area of the contour expressed by the contour data 430. For example, the OpenCV function "contourArea" may be used to generate the area data 432.

The shape data 434 may comprise information indicative of the shape of the footprint 128. For example, the shape data 434 may comprise information indicating the footprint 128 of the item 104 is a rectangle measuring 3 pixels by 7 pixels. In some implementations, the OpenCV function "cv2.approxPolyDP" may be used to determine regular polygons, the function "houghcircle" to determine a circle, and so forth, in the sensor image data 134.

The perimeter data 436 may comprise information indicative of a perimeter of one or more contours within the footprint 128. The perimeter data 436 may include perimeter length, indicative of a distance along an edge of the contour. For example, the perimeter data 436 may comprise information indicating the footprint 128 includes four contours, each having a perimeter length of 4 pixels, and having a total perimeter length of 16 pixels.

The item data 126 may provide information about an individual item 104, while the footprint data 336 comprises information about one or more of the items 104 as detected by the optical sensor array 130. The processing module 328 may use the information in the data store 320 to generate additional information such as quantity data 412. For example, the area value expressed by the area data 432 (for a footprint 128 that may include a plurality of an item 104) may be divided by the area value expressed by the area data 404 (for a footprint 128 of a single item 104) to determine the quantity data 412.

In another implementation, the processing module 328 may determine a total perimeter length of a total area bounded by one or more contours. For example, the footprint 128 may have four discrete contours, each with a perimeter length of 4 pixels. An item perimeter length of a single item 104 may be retrieved. Continuing the example, a single item 104 may be determined during intake as having a perimeter length of 4 pixels. Data indicative of a relationship, such as an algorithm expressing a relationship between perimeter length and number of items 104 may be accessed. The quantity data 412 may be determined using the total perimeter length and the relationship. Continuing the example, a perimeter of 6 pixels may be determined to provide quantity data 412 assuming the items 104 are square and the squares are adjacent to one another. In one implementation, the perimeter may be determined using the "cv2.arcLength( )" function of OpenCV.

In one implementation, the processing module 328 may generate other information about the items 104 stowed at the inventory location 114. For example, where the contour data 430 indicates a plurality of footprints 128 such as where items 104 in the partitioned area 132 are arranged in a haphazard fashion, an alert may be provided to a user 116 of the facility 102 indicating that these items 104 should be faced or rearranged into a tidy configuration.

In another implementation, the processing module 328 may generate information indicating that an item 104 has been misplaced in an incorrect partitioned area 132. For example, the shape data 434 may be compared with the shape data 406. Based on a mismatch, it may be determined an item 104 has been incorrectly stowed in the wrong partitioned area 132.

Figure 5:
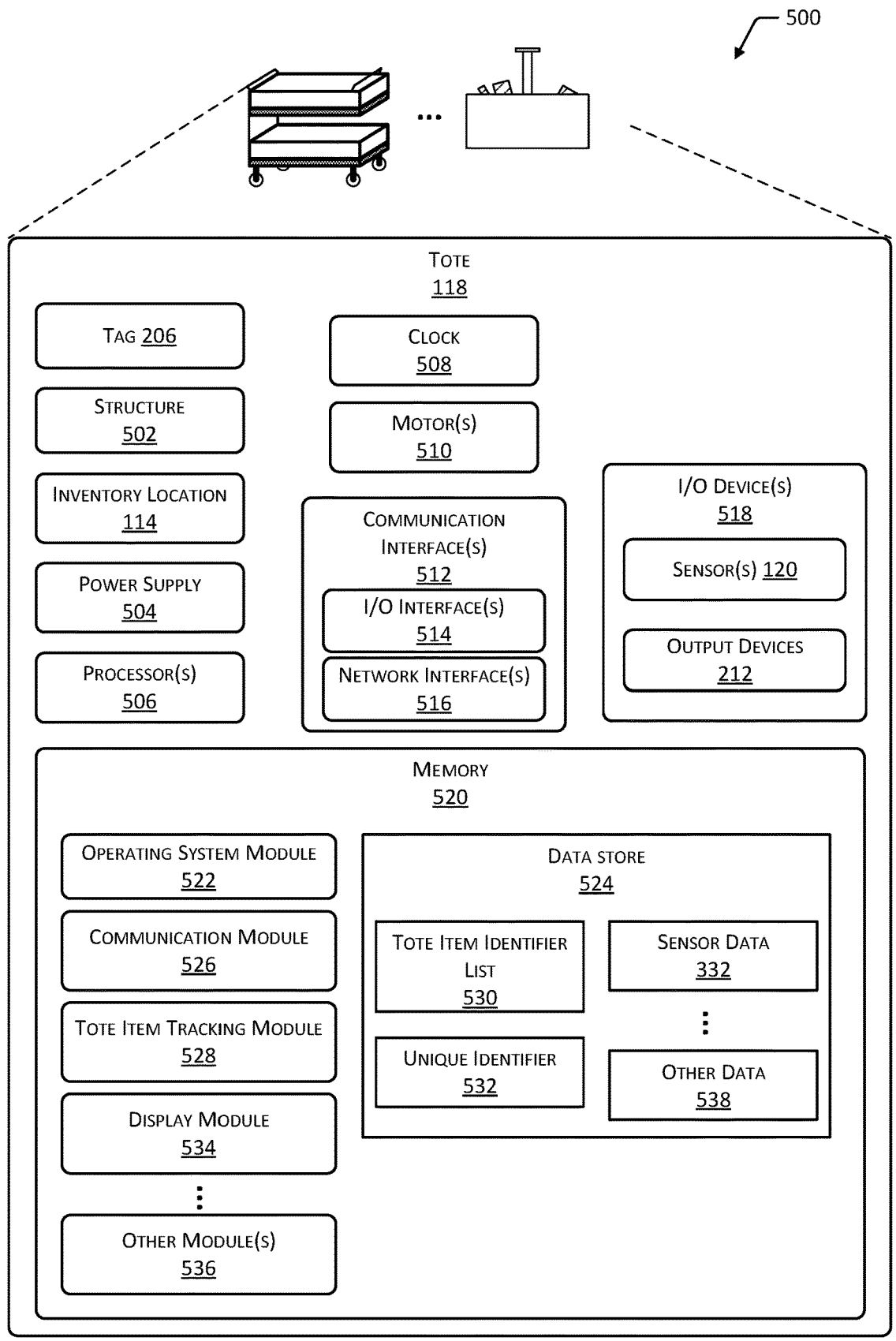
FIG. 5 illustrates a block diagram of a tote, according to some implementations.

FIG. 5 is a block diagram 500 of the tote 118, according to some implementations. The tote 118 may include several form factors such as a wheeled cart, hand-carried cart, bag, and so forth. For example, the tote 118 may include a plurality of wheels enabling the tote 118 to be moved within the facility 102.

In some implementations, the tote 118 may have identifiers, tags 206, or other indicia thereupon. The tag 206 may be affixed to, integral with, or otherwise associated with the tote 118. For example, a machine-readable optical code, such as a barcode, may be affixed to a side of the tote 118.

The tote 118 may comprise a structure 502. The structure 502 may include components comprising one or more of metal, plastic, composite materials, ceramic, wood, and so forth. For example, the structure 502 may comprise a carbon-fiber frame. One or more inventory locations 114 may be integral with, or attached to, the structure 502. For example, the structure 502 may comprise a frame with wheels while the inventory location 114 comprises a basket to hold one or more items 104 during use.

The tote 118 may include a power supply 504. The power supply 504 is configured to provide electrical power suitable for operating the components in the tote 118 or coupled thereto. For example, the power supply 504 may comprise batteries, capacitors, fuel cells, photovoltaic cells, wireless power receivers, conductive couplings suitable for attachment to an external power source, and so forth.

The tote 118 may include one or more hardware processors 506 (processors) configured to execute one or more stored instructions. The processors 506 may comprise one or more cores. One or more clocks 508 may provide information indicative of date, time, ticks, and so forth. For example, the processor 506 may use data from the clock 508 to trigger a preprogrammed action, generate a timestamp for sensor data 332 acquired by the sensors 120 onboard the tote 118, and so forth.

In some implementations, the tote 118 may include one or more motors 510 or other motive devices. The motor 510 may be configured to move or assist the user 116 in moving the tote 118 from one location to another within the facility 102. For example, in one implementation, the tote 118 may comprise a wheeled vehicle able to move within the facility 102, such as from one aisle 112 to another.

The tote 118 may include one or more communication interfaces 512 such as I/O interfaces 514, network interfaces 516, and so forth. The communication interfaces 512 enable the tote 118, or components thereof, to communicate with other devices or components. The communication interfaces 512 may include one or more I/O interfaces 514. The I/O interfaces 514 may comprise I2C, SPI, USB, RS-232, and so forth.

The I/O interface(s) 514 may couple to one or more I/O devices 518. The I/O devices 518 may include one or more of the input devices such as the sensors 120. As described above, the sensors 120 may include cameras 120(1), buttons 120(3), touch sensors 120(4), accelerometers 120(10), gyroscopes 120(11), magnetometers 120(12), and so forth.

The I/O devices 518 may include the output devices 212 such as the haptic output devices 212(1), audio output devices 212(2), display devices 212(3), and so forth. For example, the tote 118 may comprise a display device 212(3) configured to present a graphical user interface (GUI) to the user 116. In some embodiments, the I/O devices 518 may be physically incorporated with the tote 118 or may be externally placed.

The network interfaces 516 are configured to provide communications between the tote 118 and other devices, such as other totes 118, routers, access points 210, servers 204, and so forth. The network interfaces 516 may include devices configured to couple to PANs, LANs, WANs, and so forth. For example, the network interfaces 516 may include devices compatible with Ethernet, Wi-Fi, Bluetooth, ZigBee, LTE, and so forth.

The tote 118 may also include one or more busses or other internal communications hardware or software that allow for the transfer of data between the various modules and components of the tote 118.

As shown in FIG. 5, the tote 118 includes one or more memories 520. The memory 520 comprises one or more CRSM as described above with regard to memory 316 on server 204. The memory 520 provides storage of computer-readable instructions, data structures, program modules, and other data for the operation of the tote 118. A few example functional modules are shown stored in the memory 520, although the same functionality may alternatively be implemented in hardware, firmware, or as a SOC.

The memory 520 may include at least one OS module 522. The OS module 522 is configured to manage hardware resource devices such as the I/O interfaces 514, the I/O devices 518, the communication interfaces 512, and provide various services to applications or modules executing on the processors 506. The OS module 522 may implement a variant of the FreeBSD operating system as promulgated by the FreeBSD Project; other UNIX or UNIX-like variants; a variation of the Linux operating system, such as Android as promulgated by Google, Inc. of Mountain View, Calif., USA. Other OS modules 522 may be used, such as the Windows operating system from Microsoft Corporation of Redmond, Wash., USA; the LynxOS from LynxWorks of San Jose, Calif., USA; and so forth.

One or more of the following modules may also be stored in the memory 520. These modules may be executed as foreground applications, background tasks, daemons, and so forth. The data store 524 may use a flat file, database, linked list, tree, executable code, script, or other data structure to store information. In some implementations, the data store 524 or a portion of the data store 524 may be distributed across one or more other devices including servers 204, network attached storage devices, and so forth.

A communication module 526 may be configured to establish communications with one or more of the sensors 120, servers 204, or other devices. The communications may be authenticated, encrypted, and so forth.

The memory 520 may also store a tote item tracking module 528. The tote item tracking module 528 is configured to maintain a tote item identifier list 530. The tote item identifier list 530 may comprise data indicating one or more items 104 associated with the tote 118. For example, the tote item tracking module 528 may receive input from a user 116 by way of a touch screen display with which the user 116 may enter information indicative of the item 104 placed in the tote 118. In another example, the tote item tracking module 528 may receive input from one or more I/O devices 518, such as the weight sensor 120(6), an RFID reader 120(8), and so forth. The tote item tracking module 528 may send the list of items 104 to the inventory management system 122. The tote item tracking module 528 may also be configured to receive information from the inventory management system 122. For example, a list of items 104 to be picked may be presented within a user interface on the display device 212(3) of the tote 118.

A unique identifier 532 may also be stored in the memory 520. In some implementations, the unique identifier 532 may be stored in rewritable memory, write-once-read-only memory, and so forth. For example, the unique identifier 532 may be burned into a one-time programmable, non-volatile memory, such as a programmable read-only memory (PROM). In some implementations, the unique identifier 532 may be part of a communication interface 512. For example, the unique identifier 532 may comprise a media access control (MAC) address associated with a Bluetooth interface. The communication module 526, the tote item tracking module 528, or other modules may use the unique identifier 532 when communicating with other devices such as the server 204. For example, the unique identifier 532 may be used to identify data sent by the tote 118.

The memory 520 may include a display module 534. The display module 534 may be configured to present information, such as information received from the one or more servers 204 or generated onboard the tote 118. For example, the display module 534 may comprise a markup language rendering engine configured to process user interface data received from the server 204 to generate a user interface. In some implementations, the display module 534 may also process input made to the user interface by way of input devices, such as the sensors 120.

Other modules 536 may also be stored within the memory 520. In one implementation, a data handler module may be configured to generate data indicative of the user 116, the tote 118, or another of one or more objects in range of the sensors 120 of the tote 118. For example, the data handler module may be configured to acquire data from one or more sensors 120 of the tote 118 and generate sensor data 332. For example, the sensor data 332 may comprise information from the magnetometer 120(12) indicative of orientation of the structure 502. The sensor data 332 may be stored in the data store 524 and may be sent to the server 204 for further processing. Other data 538 may also be stored within the data store 524. For example, configuration settings, pre-stored activation sequences, user interface preferences, item data 126, and so forth, may be stored within the data store 524.

The other modules 536 may also include a user authentication module, which may be configured to receive input and authenticate or identify a particular user 116. For example, the user 116 may enter a personal identification number (PIN) or may provide a fingerprint to a fingerprint reader to establish their identity.

Figure 6:
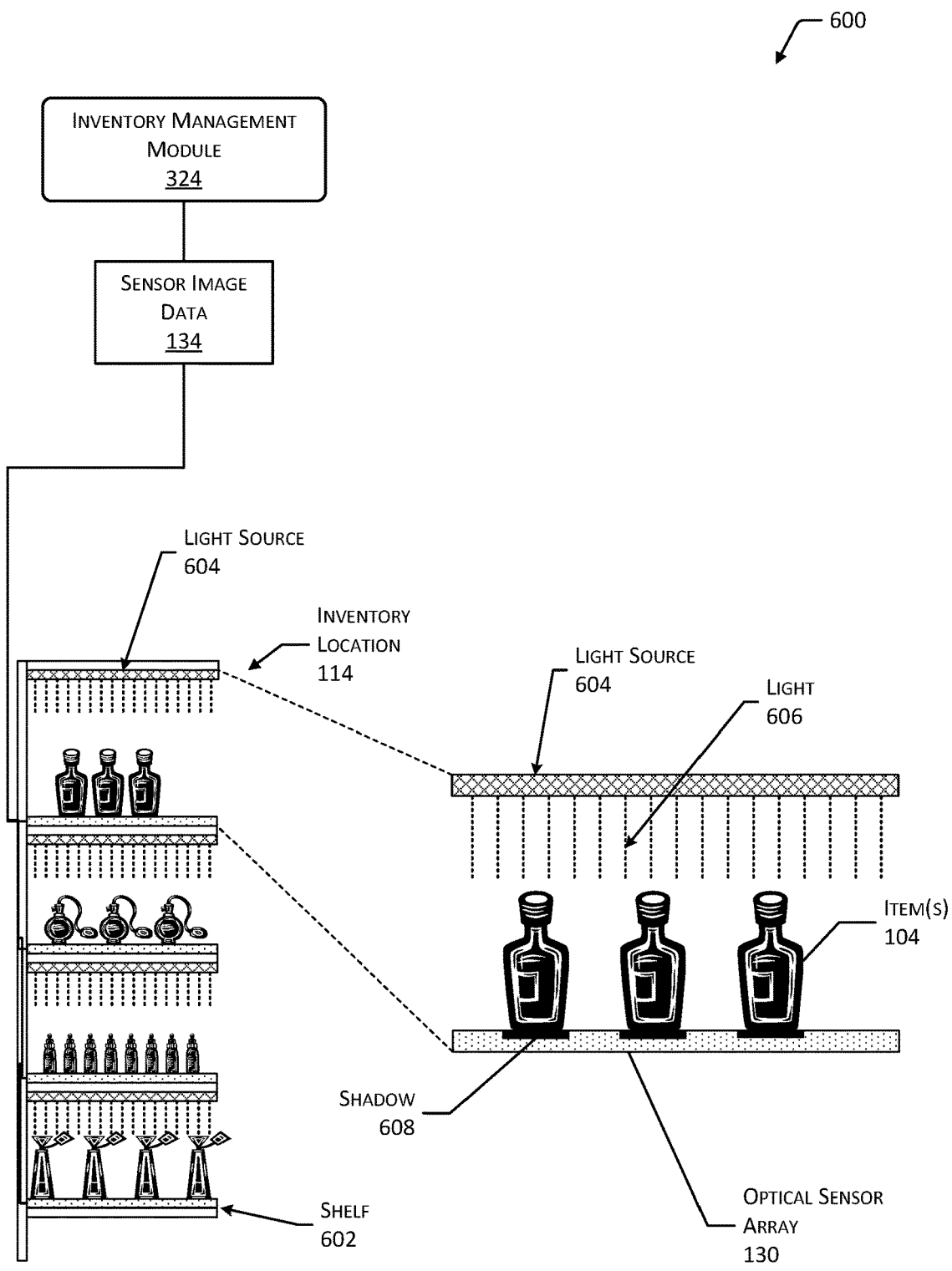
FIG. 6 illustrates a side view of an inventory location that includes an optical sensor array, according to some implementations.

FIG. 6 illustrates a side view 600 of an inventory location 114 that includes an optical sensor array 130, according to some implementations. In this illustration, the inventory location 114 comprises a shelf 602 on a rack.

Above the shelf 602 is a light source 604, configured to emit light 606. The light source 604 may comprise one or more of LEDs, quantum dots, electroluminescent devices, incandescent lamps, fluorescent lamps, and so forth. The light source 604 may be configured to emit light 606 in one or more wavelengths including, but not limited to, infrared, visible, or ultraviolet. In some implementations, to reduce dazzling the eyes of the user 116, the light source 604 may be configured to emit infrared light 606.

The light source 604 emits light 606 that is detectable by at least a portion of the optical sensors 120(7) in the optical sensor array 130. In some implementations, the light source 604 may be located elsewhere with respect to the optical sensor array 130. For example, the light source 604 may comprise an overhead light fixture that provides general illumination to the inventory location 114.

The shelf 602 may incorporate the optical sensor array 130 as illustrated in FIG. 6. For example, the shelf 602 may comprise a structure such as a piece of glass or plastic that is transparent to the wavelengths of light 606. The items 104 may rest upon the structure, as illustrated here, or may hang above the structure, such as from a peg or arm.

As a result of the light 606 impinging upon the item 104, a shadow 608 is cast upon at least a portion of the optical sensor array 130. The intensity of light within the shadow 608 may be dependent upon the transparency of the item 104. For example, a clear glass bottle holding water may cast a light shadow 608, while a black plastic bottle holding hydrogen peroxide may cast a very dark shadow 608.

The optical sensor array 130 is configured to provide sensor image data 134 to the inventory management module 324. The sensor image data 134 may then be processed by the processing module 328 to generate information about the inventory location 114, such as a quantity of items 104 stowed thereby.

The light source 604 may be configurable to modulate the light 606. The light 606 may be modulated such that the optical sensor array 130 is able to filter out or disregard other light sources 604 and obtain sensor image data 134 based on the light 606 coming from the known position of the light source 604. Modulation of light 606 may include, but is not limited to, carrier modulation, amplitude shift keying, pulse position modulation, Manchester encoding, and so forth.

The optical sensor array 130 may be configured to process the data from the optical sensors 120(7) to generate light intensity values 424 for the light 606 having the predetermined modulation. For example, data values associated with non-modulated light may be disregarded or filtered out.

In another implementation, operation of the light source 604 and the optical sensor array 130 may be time synchronized. For example, the light source 604 may be configured to emit light 606 at a particular time and for a particular duration, such as 60 milliseconds (ms). The optical sensor array 130 may be configured to acquire data from the optical sensors 120(7) while the light source 604 is emitting light 606. In some implementations, first sensor image data 134(1) acquired while the light source 604 is active may be compared with second sensor image data 134(2) acquired while the light source 604 is inactive. A comparison may be made between the first sensor image data 134(1) and the second sensor image data 134(2) to filter out or otherwise calibrate the system for ambient light.

Figure 7:
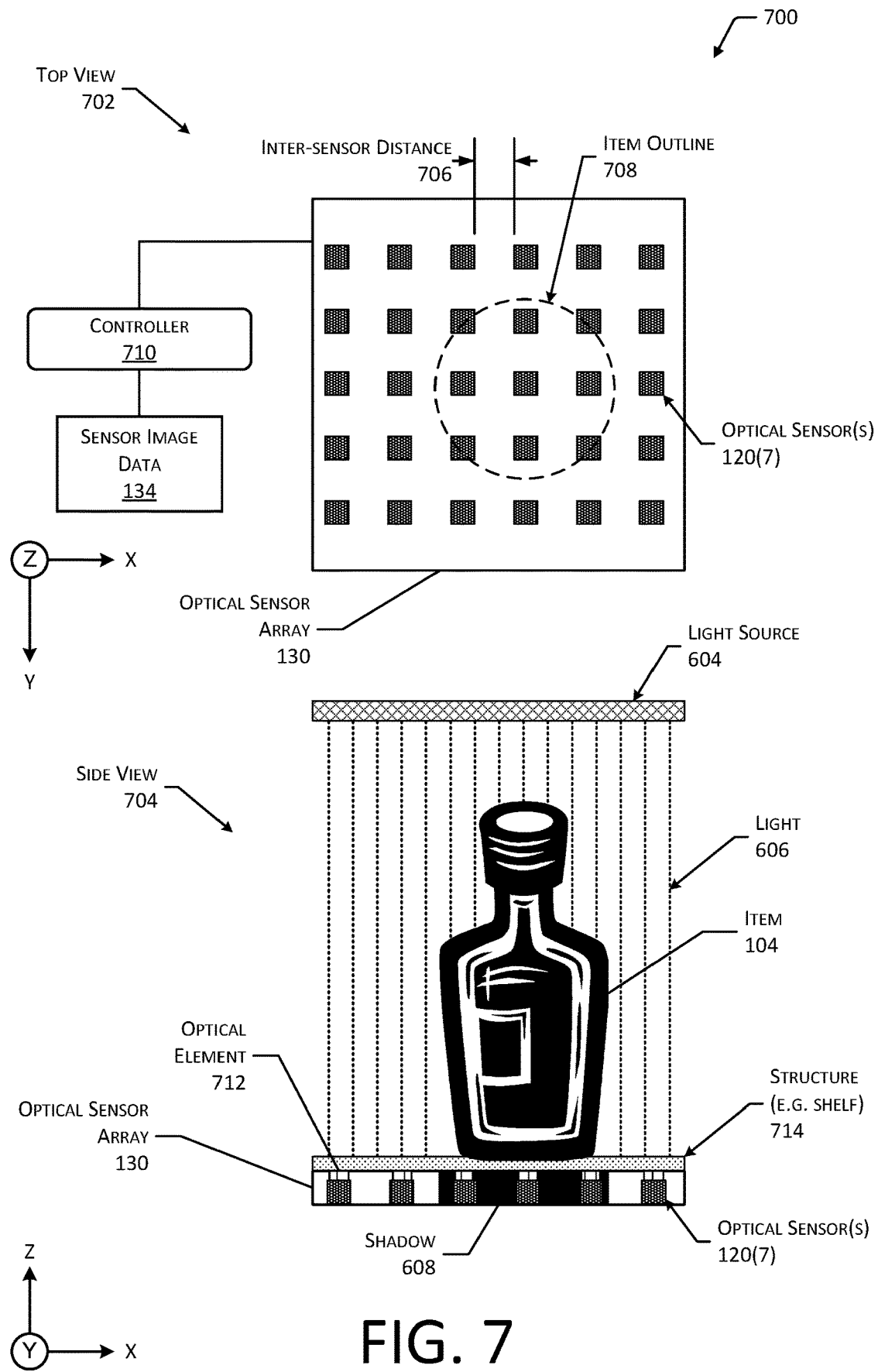
FIG. 7 illustrates enlarged top and side views of a portion of the optical sensor array, according to some implementations.

FIG. 7 is an illustration 700 of the optical sensor array 130, according to some implementations. In this illustration, a top view 702 and a side view 704 are presented.

As shown by the top view 702, the optical sensor array 130 may comprise a plurality of optical sensors 120(7). The optical sensors 120(7) may be arranged in a two-dimensional arrangement, such as the grid arrangement depicted here. The arrangement shown here comprises an array with an inter-sensor distance 706 that is approximately the same along the X and Y axes. For example, the inter-sensor distance 706 may be at least 5 millimeters (mm) between the centers or the edges of the optical sensors 120(7). In some implementations such as described below with regard to FIG. 9, the inter-sensor distance 706 may be representative of a distance between optical elements 712.

In other implementations, other arrangements of the optical sensors 120(7) may be used. For example, the arrangement may comprise a triangular space filling array with an optical sensor 120(7) located at each vertex.

The distribution or arrangement of the optical sensors 120(7) may be asymmetrical. In one implementation, the inter-sensor distance 706 may be varied. For example, a central region of the optical sensor array 130 may be sparsely populated with optical sensors 120(7) such that the inter-sensor distance 706 along the X and Y axes is greater than side regions flanking the central region. Within the side regions, the inter-sensor distance 706 may be lesser than that within the central region where the optical sensors 120(7) are sparsely populated.

For illustrative purposes, an item outline 708 of an item 104 is depicted in the top view 702. The item outline 708 and corresponding footprint 128 are discussed in more detail below.

A controller 710 may be coupled to the optical sensors 120(7) of the optical sensor array 130. The controller 710 may comprise a microcontroller or other device configured to read out or otherwise acquire information from the optical sensors 120(7). The controller 710 may be configured to use the input from the optical sensors 120(7) to generate the sensor image data 134.

The side view 704 depicts additional components of the optical sensor array 130. In some implementations, the optical sensors 120(7) may be optically coupled to one or more optical element 712 devices. The optical elements 712 may comprise optical waveguides, optical fibers, mirrors, lenses, or other devices configured to direct, focus, control, or distribute at least a portion of incident light 606 to one or more of the optical sensors 120(7). The optical elements 712 may be arranged in the two-dimensional arrangement, while the optical sensors 120(7) may be otherwise arranged. For example, in one implementation, the optical sensors 120(7) may be located along an edge of the optical sensor array 130, and the optical elements 712 may comprise optical fibers mounted and configured as an array to gather the light 606 and direct the light 606 to the optical sensors 120(7).

As described above, in some implementations, a structure 714 may provide physical support for an item 104, may protect the optical sensor array 130 from damage, and so forth. The structure 714 may comprise a material transmissive to the wavelengths of light 606 that are detectable by the optical sensors 120(7). For example, the structure 714 may comprise glass or plastic that is transparent or translucent. In some implementations, the structure 714 may comprise a mesh or a material with holes through which light 606 may pass.

In the implementation depicted here, the item 104 rests upon the structure 714. In other implementations, the item 104 may be supported or suspended from above the structure 714. The footprint 128 may comprise the shadow 608 cast by the hanging items 104. For example, the items 104 may be hanging from a peg or a hook.

In the implementation depicted here, the optical sensor array 130 is located below the item 104. The optical sensors 120(7) detect light 606 from above the structure 714, such as passing through the shelf. In other implementations, the optical sensor array 130 may be located in other positions relative to the item 104, such as above or behind. For example, the light source 604 and the optical sensor array 130 depicted in FIG. 7 may be transposed, such that the light 606 beneath the structure 714 is emitted and directed upward toward the optical sensor array 130. The footprint 128 may comprise the shadow 608 cast by the light source 604 below onto the optical sensor array 130 above. In another example, the optical sensor array 130 may be arranged vertically, such as to the rear or one side of the partitioned area 132, to gather data about height of items 104.

Figure 8:
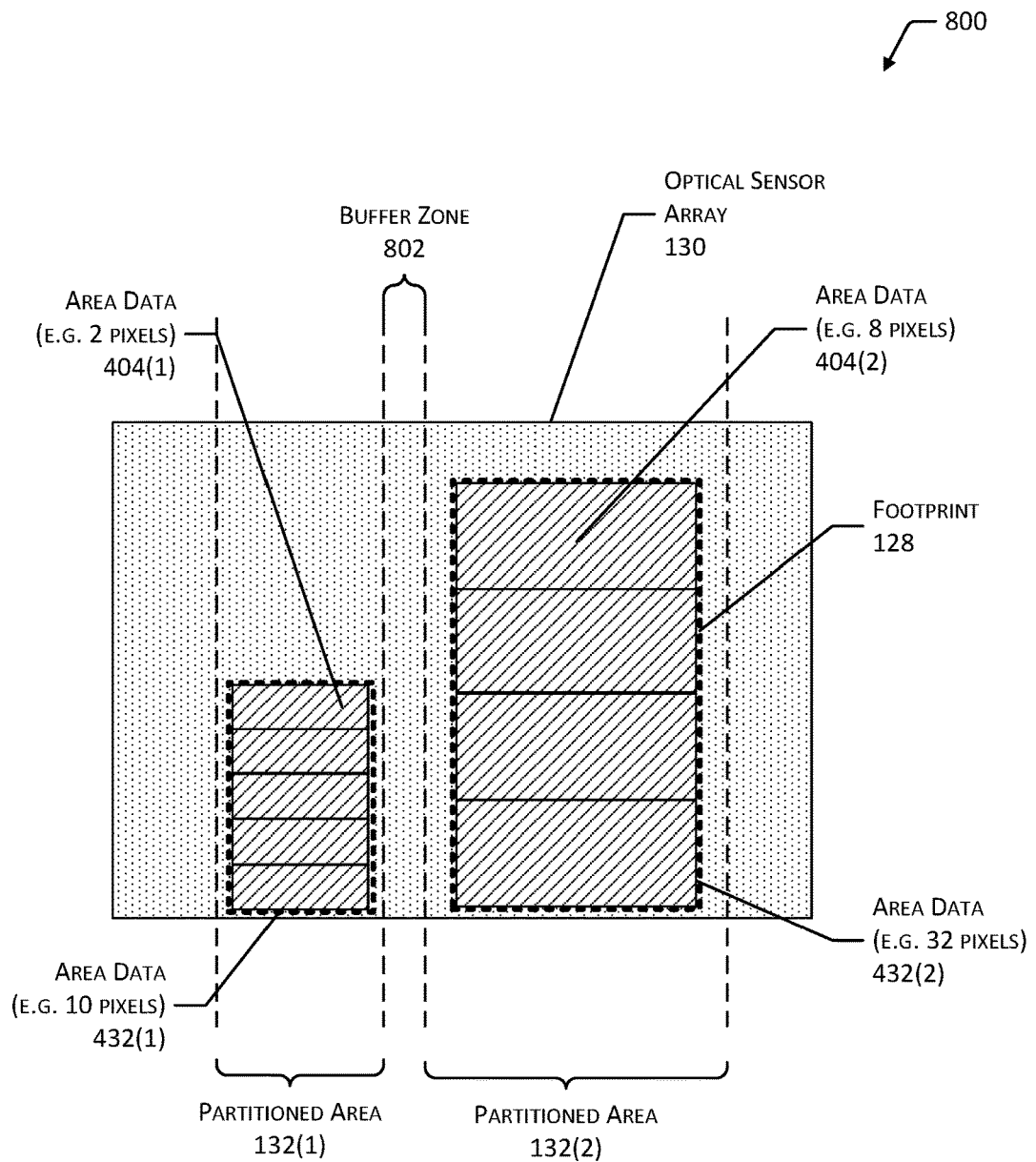
FIG. 8 illustrates partitioned areas on the optical sensor array and footprints of items, according to some implementations.

FIG. 8 is an illustration 800 of partitioned areas 132 on the optical sensor array 130 and footprints 128 of items 104, according to some implementations. As described above, in some implementations, a single optical sensor array 130 may service an inventory location 114 that contains several different kinds of items 104. Partition data 330 may be generated that designates a particular portion or area of the optical sensor array 130 or of the sensor image data 134 as being associated with a particular partitioned area 132.

In this illustration, the optical sensor array 130 has been partitioned into a first partitioned area 132(1) and a second partitioned area 132(2). A buffer zone 802 may be provided to improve distinction between the partitioned areas 132. The processing module 328 may access the partition data 330 for each of the partitioned areas 132 and determine the item identifier 402 associated with each. Based on the item identifier 402, the processing module 328 may retrieve item data 126, such as area data 404 for an individual item 104. As depicted here, the area data 404 is indicative of an area of a single item 104. The area data 404 for different items 104 may differ. For example, the area data 404(1) for item 104(1) is 2 pixels, while the area data 404(2) for the item 104(2) is 8 pixels.

In comparison, the area data 432 comprises the total area of the quantity of the item 104 in the partitioned area 132. In some implementations, the area data 432 may comprise a contiguous footprint 128, such as when the items 104 are adjacent to one another as depicted here. In other implementations, the area data 432 may comprise a sum of the individual footprints 128 of the items 104 within the partitioned area 132. The footprint 128 corresponding to the area data 432 is indicated here by a dotted line around the perimeter of the items 104.

In another implementation, the optical sensor array 130 may be mounted to gather footprint data 336 of a stack of items. For example, the optical sensor array 130 may be located on a side wall or partition separating the partitioned area 132(1) from 132(2). The light source 604 may be arranged on the opposite side of the partitioned area 132. In this implementation, the footprint 128 and corresponding area data 404 may be used to determine a quantity of items 104 that are stacked one upon another.

A plurality of optical sensor arrays 130 may be used in conjunction with the same inventory location 114, partitioned area 132, and so forth. For example, two or more optical sensor arrays 130 mounted perpendicular to one another may be used to generate two sets of footprint data 336 of items 104. Based at least in part on this footprint data, a volume occupied by the items 104 may be determined, and the quantity determined.

As described above, the processing module 328 may calculate quantity data 412 for a particular partitioned area 132 at a particular inventory location 114. The calculation may comprise dividing the area data 432 by the area data 404, and rounding the resulting value to a nearest integer value. The integer value may then be used as the quantity data 412.

Figure 9:
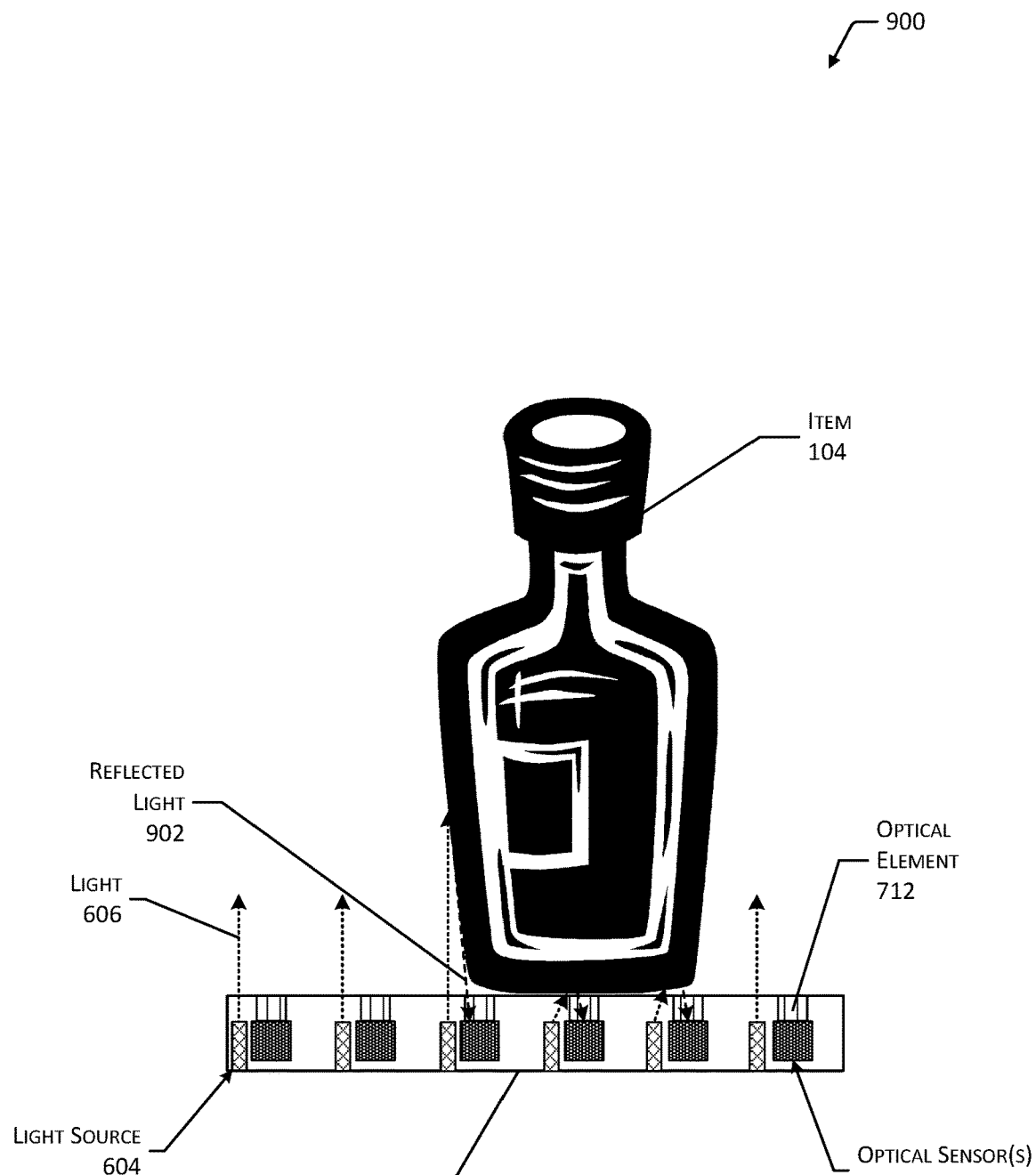
FIG. 9 illustrates enlarged views of a portion of an optical sensor array using a light source adjacent to an optical sensor, according to some implementations.

FIG. 9 illustrates another implementation 900 of an optical sensor array 130. This implementation 900 may be utilized in situations such as where the inventory location 114 is open from above or an overhead light source 604 is otherwise infeasible for design, aesthetic, or engineering reasons.

In this implementation, the light source 604 is included in the optical sensor array 130. For example, the light sources 604 may comprise LEDs that are configured to emit light 606 toward where the item 104 may be stowed. The light 606 may be reflected from the item 104, the reflected light 902 may be detected by one or more of the optical sensors 120(7). In some implementations, the light 606 may be distributed from the light source 604 using an optical waveguide, fiber optic fibers, or other features.

In one implementation, the optical sensor array 130 may comprise a plurality of optical proximity sensors. The optical proximity sensors may use data indicative of proximity of an object such as the item 104 to generate the sensor image data 134.

In other implementations, non-optical proximity sensors may be used. For example, an array of capacitive proximity sensors may be used to generate the sensor image data 134.

Figure 10:
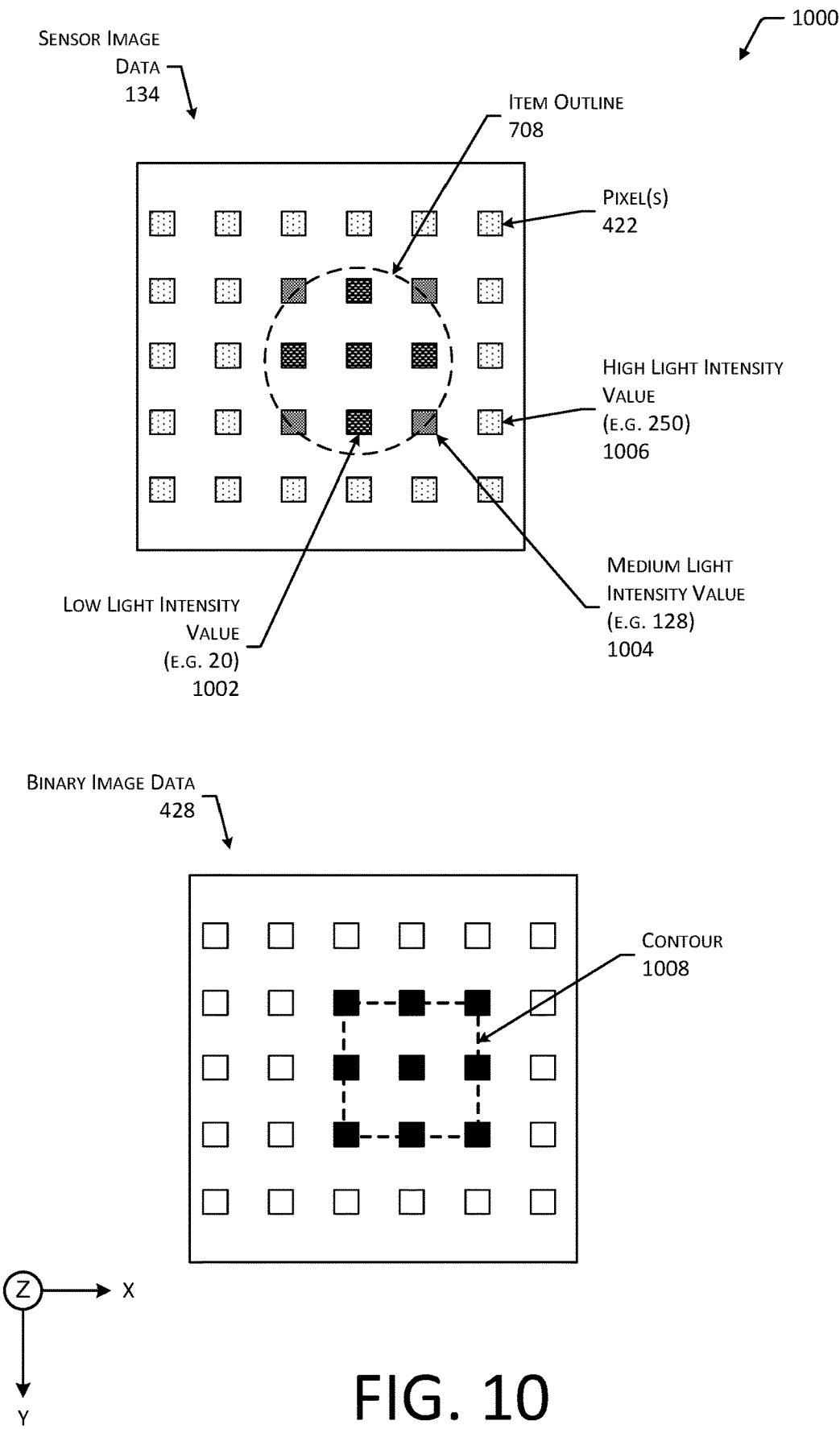
FIG. 10 illustrates sensor image data, binary image data, and a contour of a footprint of an item, according to some implementations.

FIG. 10 illustrates sensor image data 134, binary image data 428, and a contour of a footprint 128 of an item 104, according to some implementations.

As described above, the sensor image data 134 may comprise information about a plurality of pixels 422. The pixels 422 provide information about the light intensity value 424 at a particular set of coordinates 426. For illustrative purposes only, and not by way of limitation, the pixels 422 are depicted in this figure as being spaced with regard to one another at the inter-sensor distance 706. However, during processing of the sensor image data 134, the pixels 422 may be visualized or processed as if they were immediately adjacent one another with no intervening inter-sensor distance 706.

Presence of the item 104 adjacent to the optical sensor array 130 as illuminated by the light 606 will cast a shadow 608 upon the optical sensors 120(7) in the optical sensor array 130. In this illustration, low light intensity value 1002 pixels are depicted as being those pixels 422 for which the item 104 completely covers or obscures the light 606. In this illustration, the item outline 708 is circular, and as a result, some of the optical sensors 120(7) are only partially covered, allowing more of the light 606 to impinge thereupon. These partially obscured pixels 422 thus exhibit a medium light intensity value 1004. In comparison, the unobscured pixels 422 thus exhibit a high light intensity value 1006.

In some implementations, the sensor image data 134 may be visualized as a grayscale image. As described above, the processing module 328 may generate binary image data 428 from the sensor image data 134. For example, the threshold value may be 200. As a result of the thresholding process, the pixels 422 having a light intensity value 424 of less than or equal to 200 may then be set to a binary "1".

The processing module 328 may process the binary image data 428 to determine the contour data 430. The contour data 430 may comprise information about one or more contours 1008 within the binary image data 428. For example, a single contour 1008 is depicted in FIG. 10. The processing module 328 may also determine an area of the contour 1008. For a single item 104, such as determined during the intake process, the area encompassed by the contour 1008 may be stored as the area data 404. For example, the area data 404 for the contour 1008 depicted may be 9 pixels.

Illustrative Processes

Figure 11:
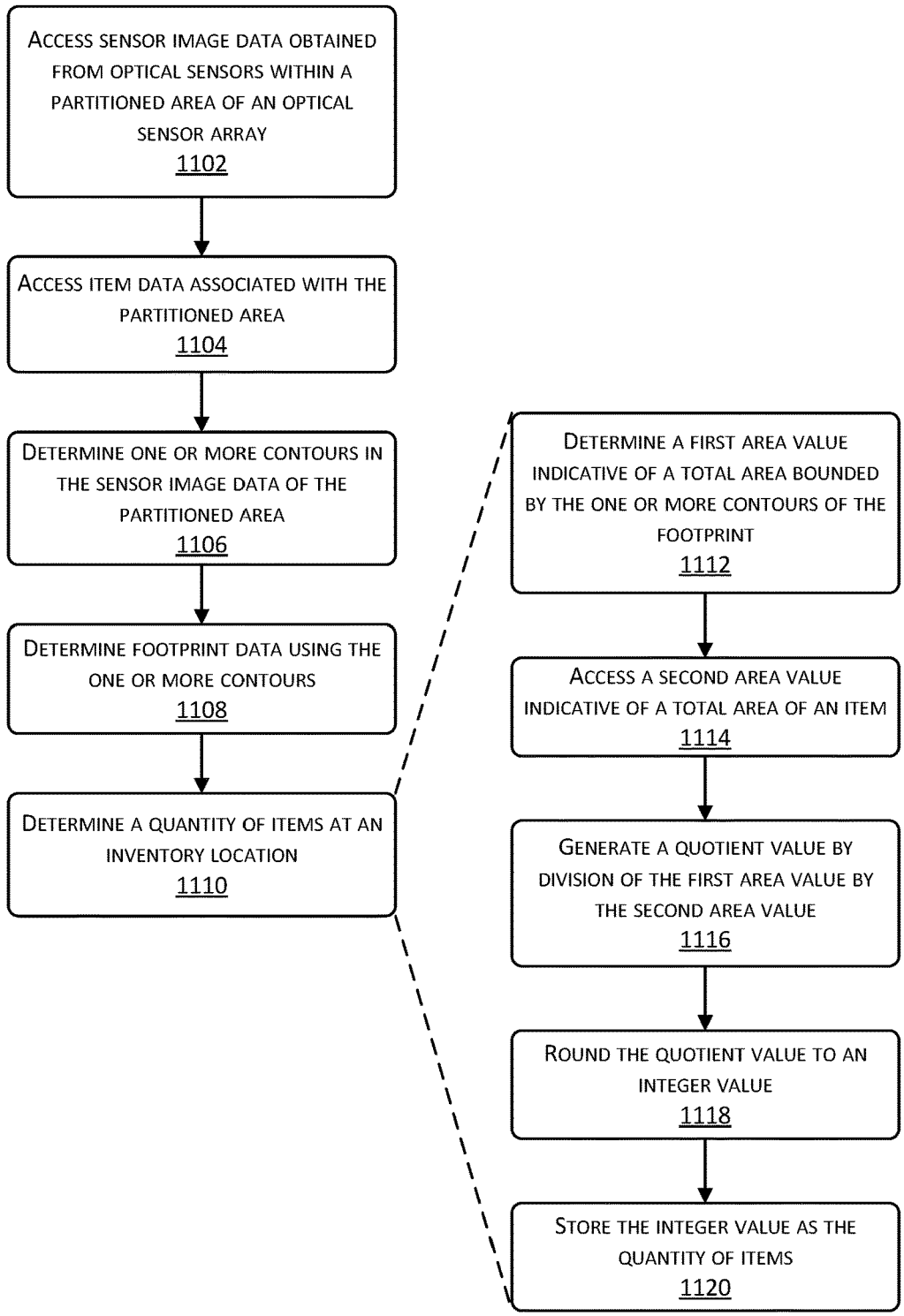
FIG. 11 depicts a flow diagram of a process for determining a quantity of items at an inventory location using sensor image data from the optical sensor array, according to some implementations.

FIG. 11 depicts a flow diagram 1100 of a process for determining a quantity of items 104 at an inventory location 114 using sensor image data 134 from the optical sensor array 130, according to some implementations. In some implementations, the process may be implemented at least in part by the inventory management module 324. In different implementations, one or more of the blocks described below may be omitted, the sequence of the process using these blocks may vary from that depicted, and so forth.

Block 1102 accesses sensor image data 134 obtained from optical sensors 120(7) within a subset or a partitioned area 132 of the optical sensor array 130. For example, the sensor image data 134 may be divided or segregated into subsets according to the partitioned area 132. The portion of the sensor image data 134 corresponding to the partitioned area 132 may be processed as described herein. Pixels 422 outside of the partitioned area 132 may be disregarded.

Block 1104 accesses item data 126 associated with the partitioned area 132. For example, the partition data 330 may indicate an inventory location ID 410. The item data 126 may be retrieved using the inventory location ID 410 to determine the item identifier 402 associated with the items 104 stored therein.

Block 1106 determines one or more contours 1008 in the sensor image data 134 of the partitioned area 132. For example, the processing module 328 may use the techniques described above such as thresholding the sensor image data 134 to generate binary image data 428. The binary image data 428 may then be processed to determine the contour data 430 indicative of one or more contours 1008 present in the sensor image data 134.

Block 1108 determines footprint data 336 using the one or more contours 1008. For example, processing module 328 may calculate the area data 432 using the one or more contours 1008.

Block 1110 determines quantity data 412 indicative of a quantity of the items 104 at the inventory location 114 based on the footprint data 336 and the item data 126. The quantity data 412 may be an estimate of the quantity of the item 104.

The determination of the quantity data 412 may include blocks 1112 through 1118 described next.

Block 1112 determines a first area value indicative of a total area bounded by the one or more contours 1008 of the footprint 128. For example, the first area value may comprise a sum of the areas of the individual items 104 in the partitioned area 132 of the inventory location 114.

Block 1114 accesses a second area value indicative of a total area of an individual item 104. For example, the second area value may comprise information obtained during an intake processing and registration of the item 104 with the facility 102.

Block 1116 generates a quotient value by dividing first area value by second area value.

Block 1118 rounds the quotient value to an integer value. For example, the quotient value may be rounded to the nearest whole number.

Block 1120 stores the integer value as the quantity data 412.

Changes to the quantity data 412 may be determined by comparing quantity data 412 acquired at different times. For example, first quantity data 412(1) may be determined at a first time. Second quantity data 412(2) may be determined at a second time later than the first time. A variance indicative of a change in the quantity of items 104 at the inventory location 114 may be determined by subtracting the first quantity data 412(1) from the second quantity data 412(2).

The process to determine the quantity data 412 may be determined at predetermined time intervals, such as every 200 ms as indicated by the clock 306. In another implementation, the quantity data 412 may be determined and variance calculated after a change between subsequently acquired sensor image data 134 meet or exceed a threshold value. For example, the processing module 328 may compare the first sensor image data 134(1) with the second sensor image data 134(2). When the values of a threshold number of pixels 422 have exceeded a threshold change level, a change may be determined to have occurred at the inventory location 114, and the variance may be calculated.

Figure 12:
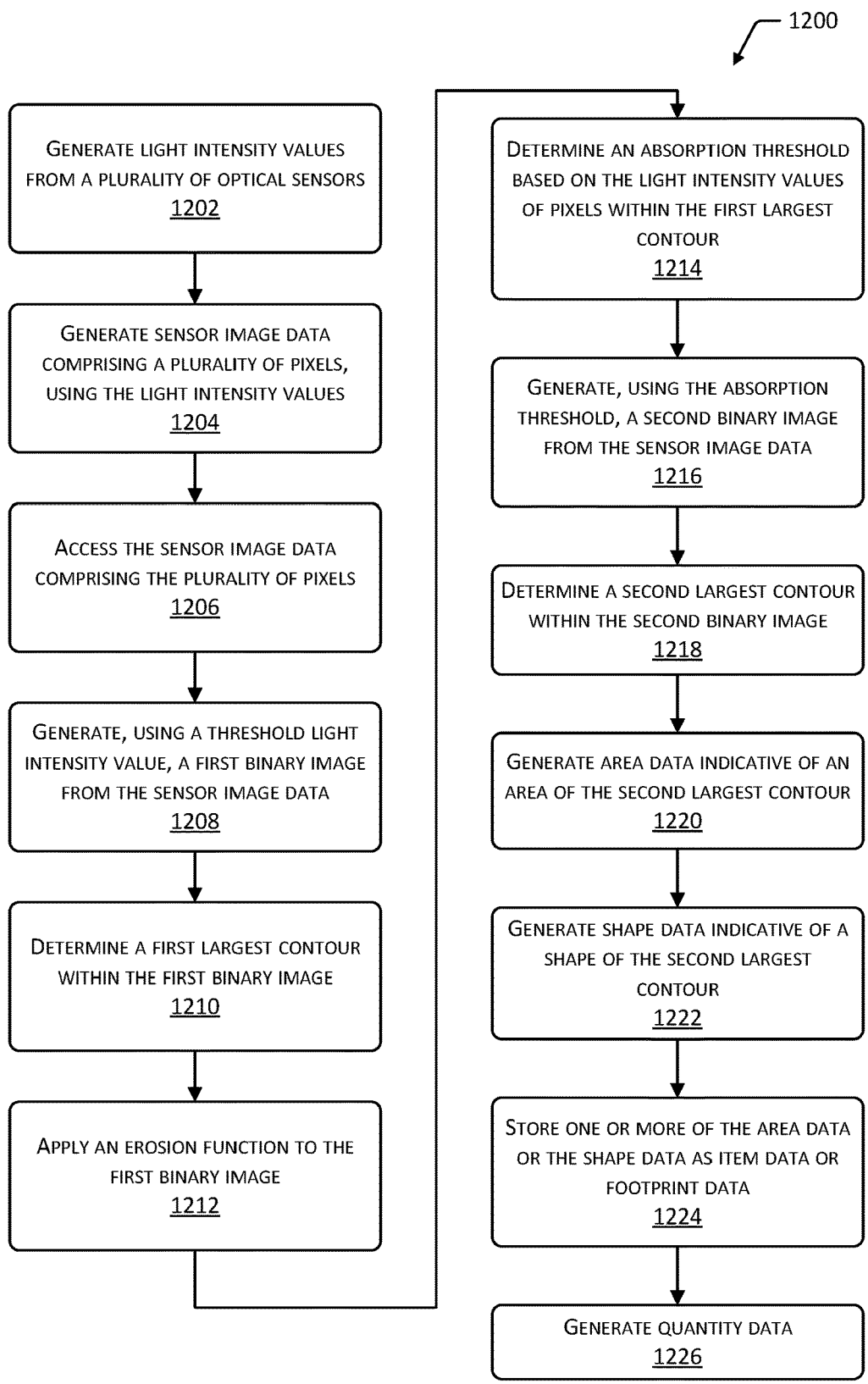
FIG. 12 depicts a flow diagram of a process for generating information indicative of a footprint, according to some implementations.

FIG. 12 depicts a flow diagram 1200 of a process for generating information indicative of a footprint 128, such as item data 126 or footprint data 336, according to some implementations. In some implementations, the process may be implemented at least in part by the inventory management module 324. In different implementations, one or more of the blocks described below may be omitted, the sequence of the process using these blocks may vary from that depicted, and so forth.

The process depicted may be used to generate item data 126 such as for an item 104 being added to the facility 102. In particular, the process described by blocks 1202 through 1224 may be implemented to generate item data 126.

The process may also be used to generate footprint data 336 for items 104 that have been previously processed to generate item data 126. In particular, the process described by blocks 1202-1206 and 1216-1224 may be implemented to generate the footprint data 336.

Block 1202 generates light intensity values 424 from the plurality of optical sensors 120(7). For example, the controller 710 may receive from or read out signals from the individual optical sensors 120(7).

Block 1204 generates sensor image data 134. As described above, the sensor image data 134 may comprise a plurality of pixels 422. Each pixel 422 in turn may comprise the light intensity value 424 at a particular relative position in the two-dimensional arrangement of the optical sensors 120(7).

Block 1206 accesses the sensor image data 134 comprising the plurality of pixels 422. For example, the sensor image data 134 may be retrieved from the data store 320.

Block 1208 generates, using a threshold light intensity value, a first binary image. For example, the processing module 328 may access the threshold value and generate first binary image data 428(1). In some implementations, the threshold value may be manually determined such as from input by a programmer or user 116. In other implementations, the threshold value may be determined such as by applying one or more mathematical operations to the light intensity values 424. For example, the threshold value may comprise a statistical mode indicating an intensity value that occurs most frequently within the sensor image data 134.

The processing module 328 may generate the first binary image from the plurality of pixels 422, wherein pixels 422 in the first binary image are assigned a value of "1" when the light intensity value 424 is less than or equal to the threshold value and "0" when the light intensity value 424 is greater than the threshold value.

Block 1210 determines one or more contours 1008 present in the first binary image. In some implementations, the determination may be made as to the largest contour 1008 present in the first binary image. For example, the processing module 328 may use the "findContour" function of OpenCV to generate the contour data 430 from the first binary image data 428(1). The contour 1008 having one or more of the largest area, largest perimeter, greatest width, greatest length, and so forth, may be designated as a largest contour 1008. For example, the contour 1008 having the greatest area expressed as a sum of pixels 422 within the boundaries of the contour 1008 may be designated as the largest contour 1008.

Block 1212 may apply one or more filters or functions to the first binary image. In one implementation, an erode or erosion function such as the "erode" function of OpenCV may be applied to the first binary image data 428(1). The erode function may be configured to set to a value of "0" those pixels 422 in the first binary image adjacent to, but not part of, the first largest contour 1008. For example, the erode function may be used to reduce noise in the binary image data 428.

Block 1214 determines an absorption threshold based on the light intensity values 424 from the plurality of pixels 422 within the first largest contour 1008. As described above, the absorption threshold is indicative of a transparency of an item 104. In one implementation, percentiles for the light intensity values 424 for the pixels 422 within the first largest contour 1008 may be determined. The absorption threshold data 408 may comprise the light intensity value 424 corresponding to the $75^{th}$ percentile of the light intensity values 424 for the pixels 422 within the first largest contour 1008. In some implementations, the percentile used may vary based at least in part on an item type or other item data 126.

Block 1216 generates, using the absorption threshold data 408, second binary image data 428(2) from the sensor image data 134. The second binary image data 428(2) may thus be representative of the pixels 422 that are within the $75^{th}$ percentile.

The second binary image may be generated from the plurality of pixels 422, wherein the pixels 422 in the second binary image have a value of "1" when the light intensity value 424 is less than or equal to the absorption threshold and "0" when the light intensity value 424 is greater than the absorption threshold.

Block 1218 determines a second largest contour 1008(2) within the second binary image. For example, as above with regard to block 1210, the "findContour" function may be used to determine the contour 1008 within the second binary image data 428(2).

In some implementations where the process is being used for an item 104 for which item data 126 is available, the absorption threshold data 408 may be retrieved from the item data 126. As described above, the absorption threshold data 408 is indicative of transparency of an item 104. The second binary image data 428(2) may then result from a comparison of the light intensity values 424 with respect to the value of the absorption threshold data 408.

Block 1220 generates area data 404 or 432 indicative of an area of the second largest contour 1008(2). For example, the OpenCV function "contourArea" may be used to process the second binary image data 428(2) to generate the area data 404 or 432. As described above, the area data may be indicated in terms of pixels, units of linear measurement, and so forth.

Block 1222 generates shape data 406 or 434 indicative of a shape of the second largest contour 1008(2). For example, the contour data 430 of the second binary image data 428(2) may be processed using one or more classifiers to characterize the shape.

In some implementations, the process may be iterated multiple times to generate additional versions of one or more of area data or shape data. For example, additional sensor image data 134 may be acquired. One or more statistical operations may be applied to the data produced thereby. For example, the area data 432 resulting from the processing of ten consecutive pieces of sensor image data 134 acquired at 10 consecutive points in time may be acquired. The values from these ten consecutive pieces of sensor image data 134 may then be averaged to generate the area data 432.

Block 1224 stores one or more of the area data or the shape data as item data 126 or footprint data 336.

Block 1226 may generate quantity data 412. The quantity data 412 may comprise an estimate of the number of items 104. The generation of the quantity data 412 may include one or more of the following blocks (not depicted). A partitioned area 132 of the sensor image data 134 associated with stowage of a particular item 104 is determined. The item data 126 associated with the particular item 104 is accessed. As described above, the item data 126 may include area data 404 indicative of an area of a single one of the item 104. The quantity data 412 may be generated by dividing the area data 432 of the footprint 128 by the area data 404 of the single one of the item 104.

Figure 13:
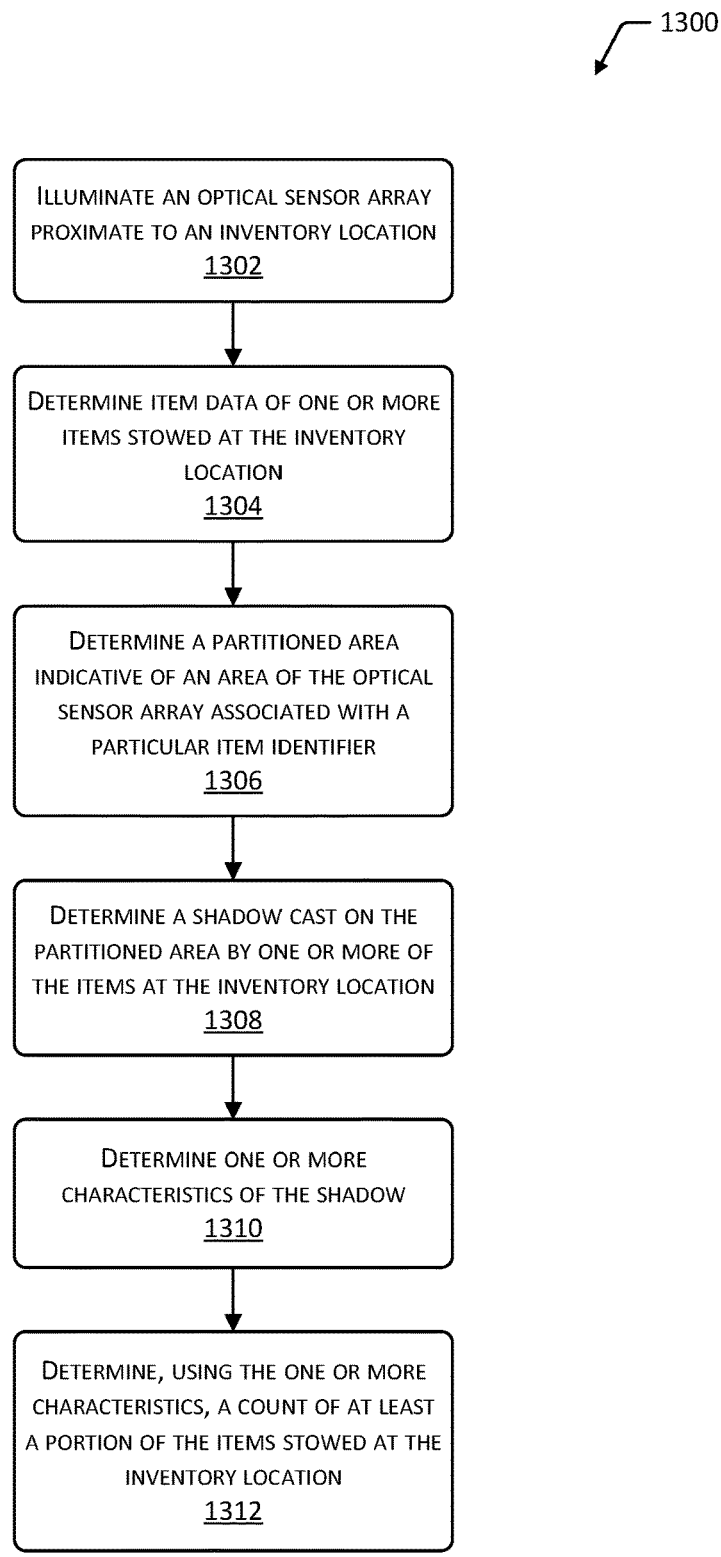
FIG. 13 depicts a flow diagram of another process for determining a quantity of items at an inventory location, according to some implementations.

FIG. 13 depicts a flow diagram 1300 of another process for determining a quantity of items 104 at an inventory location 114, according to some implementations. In some implementations, the process may be implemented at least in part by the inventory management module 324. In different implementations, one or more of the blocks described below may be omitted, the sequence of the process using these blocks may vary from that depicted, and so forth.

Block 1302 illuminates an optical sensor array 130. As described above, the optical sensor array 130 may be proximate to an inventory location 114.

Block 1304 determines item data 126 of items 104 associated with the optical sensor array 130. As described above, the item data 126 may include information indicative of an area of a shadow 608 of a single item 104, such as the area data 404.

Block 1306 determines a partitioned area 132 indicative of an area of the optical sensor array 130 associated with a particular item identifier 402.

Block 1308 determines, in first sensor image data 134(1), a shadow 608 cast by one or more items 104 between a light source 604 and the optical sensor array 130 on a partitioned area 132 at the inventory location 114. For example, the first sensor image data 134(1) may be acquired from the optical sensor array 130.

Block 1310 determines one or more characteristics of the shadow 608. For example, the characteristics of the shadow 608 may include the area, shape, perimeter length, width, length, and so forth.

Block 1312 determines, using the one or more characteristics of the shadow 608, a count of at least a portion of the items 104 stowed at the inventory location 114. For example, the area of the shadow 608 may be divided by the area of the shadow 608 of a single item 104 to generate the count of the one or more items 104.

In some implementations, the determination of the shadow 608 or the characteristics thereof may be responsive to a change between sensor image data 134 acquired at different times. For example, second sensor image data 134(2) may be acquired from the optical sensor array 130 at a time later than the first sensor image data 134(1). Duration of the time may be predetermined or variable. In one implementation, the time may be specified at about 300 ms to minimize incorrect output due to changes in the footprint 128 resulting from handling of the items 104 still being in progress. The processing module 328 may determine that the second sensor image data 134(2) differs from the first sensor image data 134(1) by a threshold value. For example, the first sensor image data 134(1) may be subtracted from the second sensor image data 134(2). When a count of the number of pixels 422 having a difference other than "0" exceeds the threshold value, the processing module 328 may determine that a difference or change has occurred.

In another implementation, the determination of the shadow 608 or the characteristics thereof may be responsive to constancy (such as indicated by a lack of change) between sensor image data 134 or other sensor data 332 acquired at different times. For example, the processing module 328 may determine a change between sensor image data 134 acquired at different times. The process may further determine that third sensor image data 134(3) acquired at a third time, such as 300 ms after the second sensor image data 134(2), does not differ from the second sensor image data 134(2) by a threshold value, indicative of constancy between the sensor images. Instead of, or in addition to time, the comparisons to determine changes may be made between sensor image data 134, such as every "n" sensor images, where n is a positive non-zero integer. Based on the apparent constancy of the images, the processing module 328 may proceed to process the sensor image data 134.

The processing by the processing module 328 of the sensor image data 134 may thus be responsive to a determination that the inventory location 114 has gone from a first stable (relatively unchanging) state to an unstable state (such as during addition or removal of items 104) and returned to a second stable state. For example, the footprint data 336, quantity data 412, and so forth, may be generated using sensor image data 134 acquired while in the first stable state and the second stable state. Responsive to this determination that the sensor image data 134 is now stable, the processing module 328 may then determine the shadow 608 or characteristics thereof, footprint data 336, and so forth using the stable sensor image data 134. To determine changes occurring at the inventory location 114, the processing module 328 may compare the sensor image data 134 acquired while in the first stable state with that acquired at the second stable state.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
   a light source;
   an optical sensor array comprising:

a plurality of optical sensors; and
a controller to generate sensor image data indicative of light intensity values at respective optical sensors of the optical sensor array; and
a computing device comprising:
a memory, storing computer-executable instructions; and
a hardware processor configured to execute the computer-executable instructions to:
illuminate an item placed on at least a portion of the optical sensor array with the light source;
access the sensor image data obtained by at least a subset of the plurality of optical sensors positioned in an area where the item is placed;
determine, based on the sensor image data, information regarding a shadow cast by the item, the information regarding the shadow cast by the item comprising one or more of:
area data,
shape data,
perimeter data, or
size data; and
store the information regarding the shadow cast by the item.

2. The system of claim 1, wherein the hardware processor is further configured to execute the computer-executable instructions to:
identify the item during intake of the item to a facility; and
designate the information regarding the shadow cast by the item as item data for a single quantity of the item.

3. The system of claim 1, wherein:
the area data is indicative of an area of the shadow cast by the item;
the shape data is indicative of a shape of the shadow cast by the item;
the perimeter data is indicative of a perimeter length along edges of the shadow cast by the item; and
the size data is indicative of a width or a length of the shadow cast by the item.

4. The system of claim 1, wherein:
the plurality of optical sensors are arranged in a two-dimensional rectangular grid arrangement; and
the sensor image data comprises a plurality of pixels, each pixel corresponding to a position within the two-dimensional rectangular grid arrangement and the each pixel comprising a light intensity value from a corresponding optical sensor at that position.

5. A system comprising:
an optical sensor array comprising a plurality of optical sensors;
a memory, storing computer-executable instructions; and
a hardware processor configured to execute the computer-executable instructions to:
receive light intensity values from the plurality of optical sensors;
generate sensor image data comprising the light intensity values obtained by a set of the plurality of optical sensors corresponding to a location on the optical sensor array on which an item is placed;
generate footprint data for the item using the sensor image data, the footprint data for the item indicative of one or more of:
a size of a footprint of the item,
a shape of the footprint of the item,
an area of the footprint of the item, or
a perimeter of the footprint of the item; and
store the footprint data for the item.

6. The system of claim 5, further comprising:
a light source positioned above the optical sensor array and directing light down onto the optical sensor array; and
the hardware processor to further execute the computer-executable instructions to:
illuminate the item on the optical sensor array using the light source;
detect a shadow cast by the item; and
designate characteristics of the shadow as the footprint data for the item.

7. The system of claim 5, further comprising:
a light source included within the optical sensor array; and
the hardware processor to further execute the computer-executable instructions to:
direct light from the light source upwards towards the item on the optical sensor array;
detect reflected light from the item; and
utilize values of the reflected light to generate the sensor image data.

8. The system of claim 5, wherein:
the plurality of optical sensors are arranged in a two-dimensional rectangular grid arrangement; and
the sensor image data comprises a plurality of pixels, each pixel comprising a light intensity value from an optical sensor at a particular position within the two-dimensional rectangular grid arrangement.

9. The system of claim 5, wherein the hardware processor is further configured to execute the computer-executable instructions to:
generate one or more binary images from the sensor image data;
determine one or more contours from the one or more binary images;
determine an area of the one or more contours; and
wherein the footprint data for the item is generated based on the area of the one or more contours.

10. The system of claim 9, wherein the computer-executable instructions to generate the one or more binary images and determine the one or more contours further comprise instructions to:
generate, using a threshold light intensity value, a first binary image;
determine a first largest contour within the first binary image;
determine an absorption threshold based on corresponding light intensity values within the first largest contour;
generate, using the absorption threshold, a second binary image;
determine a second largest contour within the second binary image; and
wherein the area of the one or more contours comprises an area of the second largest contour.

11. The system of claim 5, wherein the footprint data for the item is generated based on one or more contours of a shadow cast by the item on the optical sensor array.

12. The system of claim 5, wherein the hardware processor is further configured to execute the computer-executable instructions to:
determine an item identifier for the item;
determine absorption threshold data of the item;
determine an inventory location identifier indicative of an inventory location on which the item is to be stowed; and associate the item identifier, the absorption threshold data, and the inventory location identifier with the footprint data stored for the item.

13. The system of claim 5, further comprising one or more proximity sensors included within the optical sensor array; and
the hardware processor to further execute the computer-executable instructions to:
determine data indicative of proximity of the item to the optical sensor array using the one or more proximity sensors; and
use the data indicative of the proximity of the item to generate the sensor image data.

14. The system of claim 5, wherein the hardware processor is further configured to execute the computer-executable instructions to:
determine an overall footprint at a shelf using a second optical sensor array, after the footprint data for the item is stored;
access the footprint data for the item;
determine an integer value by dividing the overall footprint at the shelf with the footprint data for the item; and
determine a quantity of the item at the shelf based on the integer value.

15. A method comprising:
identifying an item on at least a portion of an optical sensor array;
accessing light intensity values from a plurality of optical sensors of the optical sensor array;
generating sensor image data comprising a plurality of pixels using the light intensity values;
determining one or more contours of a shadow of the item using the sensor image data;
determining area data for the shadow of the item indicative of an area of the one or more contours of the shadow of the item; and
storing the area data for the shadow of the item.

16. The method of claim 15, further comprising:
generating, using a threshold light intensity value, a first binary image from the sensor image data;
determining a first largest contour within the first binary image;
determining an absorption threshold based on the light intensity values within the first largest contour;
generating, using the absorption threshold, a second binary image;
determining a second largest contour within the second binary image; and
wherein the area data for the shadow of the item is determined based on an area of the second largest contour.

17. The method of claim 16, further comprising:
determining shape data indicative of a shape of the second largest contour; and
associating the shape data with the area data for the shadow of the item.

18. The method of claim 15, further comprising:
determining one or more of shape data or perimeter data corresponding to the one or more contours of the shadow of the item; and
associating one or more of the one or more of the shape data or the perimeter data with the area data for the shadow of the item.

19. The method of claim 15, further comprising:
identifying the item for intake to a facility;
determining an item identifier for the item;
determining an inventory location identifier for an inventory location where the item is to be stowed;
associating the item identifier and the inventory location identifier with the area data for the shadow of the item; and
wherein the associating the item identifier and the inventory location identifier with the area data for the shadow of the item is performed at the intake of the item to the facility.

20. The method of claim 15, further comprising:
accessing area data for a shelf after the area data for the shadow of the item is stored;
retrieving the area data for the shadow of the item;
determining an integer value by dividing the area data for the shelf by the area data for the shadow of the item; and
determining a quantity of the item at the shelf based on the integer value.

* * * * *